US010157360B1

(12) United States Patent
Kholkin et al.

(10) Patent No.: US 10,157,360 B1
(45) Date of Patent: Dec. 18, 2018

(54) SMART BRICKS INFORMATION SYSTEM

(71) Applicant: Comindware Ltd., Tortola (VG)

(72) Inventors: Igor Kholkin, Surgut (RU); Rinat Gimranov, Surgut (RU)

(73) Assignee: Comindware Ltd., Tortola (VG)

( * ) Notice: Subject to any disclaimer, the term of this patent is extended or adjusted under 35 U.S.C. 154(b) by 0 days.

(21) Appl. No.: 15/273,333

(22) Filed: Sep. 22, 2016

Related U.S. Application Data

(60) Provisional application No. 62/221,878, filed on Sep. 22, 2015.

(51) Int. Cl.
*G06Q 10/06* (2012.01)
*G06F 17/30* (2006.01)
*G06F 8/35* (2018.01)

(52) U.S. Cl.
CPC ............ *G06Q 10/067* (2013.01); *G06F 8/35* (2013.01); *G06F 17/30864* (2013.01); *G06F 17/30991* (2013.01)

(58) Field of Classification Search
CPC ... G06Q 10/067; G06F 8/35; G06F 17/30864; G06F 17/30991
USPC .................................................. 717/102–105
See application file for complete search history.

(56) References Cited

U.S. PATENT DOCUMENTS

| | | | | | |
|---|---|---|---|---|---|
| 5,210,689 | A | * | 5/1993 | Baker | G06F 3/0489 341/22 |
| 2006/0059032 | A1 | * | 3/2006 | Wong | G06Q 10/06 705/348 |
| 2006/0195330 | A1 | * | 8/2006 | Bogner | G06F 17/30734 705/7.37 |
| 2007/0179826 | A1 | * | 8/2007 | Cutlip | G06Q 10/06 705/7.11 |
| 2013/0305213 | A1 | * | 11/2013 | Flores | G06F 8/35 717/104 |
| 2014/0172415 | A1 | * | 6/2014 | Jo | G06F 17/2785 704/9 |
| 2015/0161260 | A1 | * | 6/2015 | Balani | G06F 17/3053 707/723 |

OTHER PUBLICATIONS

Dietz, J., Enterprise Ontology Driven Software Generation, Second International Symposium on Business Modeling and Software Design, Jan. 2012, 38 pages, [retrieved on Aug. 9, 2018], Retrieved from the Internet: <URL:https://pdfs.semanticscholar.org/92d6/896ed80b1df368abbb659255a71f48f51deb.pdf>.*

(Continued)

*Primary Examiner* — Geoffrey R St Leger
(74) *Attorney, Agent, or Firm* — Bardmesser Law Group

(57) ABSTRACT

A method, system and computer product for a Smart-Bricks Information System (IS), which solves the problems of lack of adaptability and lack of flexibility of information systems. In order to provide adaptability and flexibility of the IS, the enterprise's information space is divided into a plurality of universal micro-blocks—Smart-Bricks micro-systems. The Smart-Bricks IS implements the following: contains all necessary and sufficient system parts for the functioning of each micro-system (data, code, interface); self-assembles into "instantaneous info-conglomerates"-Smart-Bricks Instant Performances (SBIP); and runs under control of the Ontological Model of an enterprise subject area, which is adaptable to the changing conditions of a given subject area.

18 Claims, 17 Drawing Sheets

(56) References Cited

OTHER PUBLICATIONS

Wu, B., et al., Ontological Approach Towards E-business Process Automation, IEEE International Conference on e-Business Engineering (ICEBE'06), 2006, 8 pages, [retrieved on Aug. 9, 2018], Retrieved from the Internet: <URL:http://ieeexplore.ieee.org/>.*

* cited by examiner

SMART BRICKS INFORMATION SYSTEM

CROSS-REFERENCE TO RELATED APPLICATION

This application is a non-provisional application of U.S. Provisional Patent Application No. 62/221,878, filed Sep. 22, 2015, entitled SMART-BRICKS INFORMATION SYSTEM, incorporated by reference herein in its entirety.

BACKGROUND OF THE INVENTION

Field of the Invention

The invention relates to information systems, and, more particularly, to a Smart-Bricks Information System based on Smart-Bricks and Ontology-Centric Architecture, which improves functional flexibility of Enterprise Management Information Systems and their adaptability to a subject area of the enterprise.

Description of the Related Art

The industry trend of using large information systems (ISs) presents some problems with functional flexibility and adaptability of these systems to various types of enterprises. Modern software is created so that users can carry out a formal, accurately structured list of pre-specified actions for storage and information processing. However, conventional systems experience several problems.

The first problem is that the real tasks of information processing (including accounting, storage and analysis of production, financial and other operations) are often beyond such a list of pre-specified actions, because of constant changes in the subject area of IS (for example, in a business environment of the enterprise). Therefore, it is necessary to change or redevelop the software accordingly, which requires considerable amount of time, efforts, money and other resources. To solve this problem, it is required to increase adaptability of the IS to the changing conditions of a subject area. However, the existing solutions (for example, SOA discussed in detail below) cannot solve this problem completely.

The second problem is that not all information requests of users can be performed in a traditional architecture of the rigid functional-oriented monolithic applications. The existing applications performing the limited list of functional tasks (for example, finance, logistics, supply, etc.) that often do not allow a user to receive a response to the difficult and complicated requests that require integrated (or aggregated) data from various subject areas. The essence of the problem is that current applications often obstruct proper storing, structuring, and extraction of the information. Typical applications are developed usually for a fixed data scheme, which defines all types of the information, means of its access and use, and the principles of its management.

Users whose data does not correspond to such a scheme cannot use the required data for processing it by means of conventional systems. Also, the fixed schemes do not allow for connection of information from several applications— for example, to combine a list of personal contacts in the phone book with the list of musical preferences in the media player. Since the corresponding applications "do not know" each other, they cannot work with someone else's data, and even cannot refer to it. Moreover, to perform unstructured and not pre-specified actions with information, it is not sufficient to just have various data schemes. In addition to the data schemes, it is necessary to operate with semantical aspects of the user requests and with the general ontology of a subject area to which the request belongs, with the program code processing these data, and with an interface which visualize the results. In addition, all such actions should be efficiently managed.

Accordingly, to resolve the problems discussed above, it is necessary to produce improved software, which:

can easily and quickly change itself according to events that occur, or according to changes predicted in the subject area of the IS (for example, in a business environment of the enterprise);

provides, to a user, an opportunity to freely perform any of the unstructured and not pre-specified actions with information, including creating requests to the system for obtaining results from the system in real time.

Some attempts to improve adaptability of the IS have been made by the following conventional solutions. One of these solutions is a concept of service-oriented architecture of information systems (SOA), which takes some steps to solving of the first problem (enhancing of adaptability of the IS to the changes in the subject area). The idea used by the SOA is to provide system's flexibility by using separate independent redundant parts segregated within the business processes, and to provide standardized interactions between the parts organized within the information system. The SOA declares that in the case of a change of the subject area, it is required to change (to redesign) only the parts of system (i.e., services) directly affected by the changes. It was an assumption that in this case it is not necessary to redesign the entire system or its substantial part.

The SOA concepts are as follows:

Services: the SOA presents functionality necessary for a user as a set of "services"-separate, independent, full-featured, but highly specialized, logically isolated, and rigid program modules. Each of these modules carries out a particular repeating business function separated from the entire set of business processes of the enterprise. These services can be used for a narrow designated purpose (can carry out one particular business function) within a business process.

Service agreements (interfaces): an access to services is provided via certain interfaces that are platform and language independent and use open standards. The services can be connected among themselves only by means of these interfaces and everything that services know about each other is that they exist.

Autonomy: services for the outside world look like "black boxes"—i.e., they hide the internal realization and provide only interfaces for addressing themselves from the outside (i.e., from user applications). In other words, the services know nothing about the user application, which requests something from them, and this application does not know how the services carry out their business function. The SOA gives for the user applications the opportunity to request all services that are available within the IS via the service bus (ESB).

Properties and methods: the services are performed by means of strongly defined methods and possess defined properties. For performing the tasks, the processes can be executed in a certain standard way so the services do not store a state between any calls.

Architecture: architecturally the SOA consists of a uniform portal (for users access), the composite applications (supporting business processes), and the integration bus (Enterprise Service Bus), which carries out a role of the general distribution network for the services.

The SOA has a several drawbacks. While it is stated that for ensuring the necessary adaptability of the IS to changes, the application in the SOA is not represented by a monolithic code, which is, once installed, does not required and does not allow for any changes upon a change of business requirements, in reality this is not so. Only so-called "composite applications" in the SOA meet the requirements of adaptability. Such a composite application is created based on the existing IS subsystems (such as the SAP solutions, the data warehouse or public Web-service) supplied with new functionality, and integrated by the uniform interface. While it is stated that composite applications provide for an opportunity for the users to easily interact in real-time with various numerous systems, and to have transparent access to information (irrespective of complexity of the environment of its storage), only a small portion of all business processes can be supported by the composite applications. Other issues are:

existing corporate information systems, by the time of emergence of the SOA, were already very complicated;

traditional systems like ERP include a large number of business processes customized in advance according to the best practices, and only the small part of these processes can be available as services;

even automation of an enterprise "from scratch" will be much more expensive than to implement the pre-adjusted ERP solution, because it requires description of all its business processes and deploying them on the SOA.

Because of the above issues, large enterprises have not yet developed a formalized actual model of all business processes. However, without such model, a full scale SOA cannot be implemented. Respectively, the SOA is used only partially in conjunction with the traditional monolithic applications. Therefore, the advantages potentially built in the SOA are not realized, and the SOA does not provide the necessary adaptability to the changes in the subject area.

Another conventional solution is a Semantic Web. The concept of the Semantic Web deals with the second problem (increase of flexibility of the IS to the changes in users' information needs). Not all of the arising users' information needs can be satisfied in a traditional architecture of the monolithic functional applications. Therefore, it is necessary to have the solution, which would provide to the user an opportunity to carry out any of the unstructured and not pre-specified actions with the information. The Semantic Web declares an ability to give to the user similar opportunities because its main promise is support of a "data web" of the various schemes. However, the implementation of this approach is far from a real solution of the problem of flexibility.

For performing of unstructured and not pre-specified actions with information, it is not sufficient to have only various schemes of data. It is necessary to work both with data, with code and with the interface, and to control all of them. In other words, it is necessary to have the opportunity to create and execute a set of instant micro-actions in response to any request of the user to the system, keeping in mind all of the above listed aspects. These opportunities are not actually provided by the Semantic Web. There is also development in the field of ontology modeling language directed to improvement of flexibility of systems, but only in the context of the search data queries. A level of maturity of these solutions is still low. Architecture solutions of information systems based on the ontological models do not exist. Thus, the problem of flexibility of IS's is not solved by existing means used today.

Accordingly, it is desired to have to an Information System based on independent components and Ontology-Centric Architecture, which improves functional flexibility of Enterprise Management Information Systems and their adaptability to a subject area of the enterprise.

SUMMARY OF THE INVENTION

The invention relates to information systems, and, more particularly, to a Smart-Bricks Information System based on Smart-Bricks and Ontology-Centric Architecture, which improves functional flexibility of Enterprise Management Information Systems and their adaptability to a subject area of the enterprise, and which substantially overcomes one or more disadvantages of the related art.

The invention belongs to the area of IS's for companies and enterprises processing information in the area of their business activity (in the subject area) with the purpose of maintaining the accounting, analytics and solutions support. The exemplary embodiment solves the problems of lack of adaptability and lack of flexibility of information systems. In order to provide adaptability and flexibility of the IS, the enterprise's information space is divided into a plurality of universal micro-blocks (Smart-Bricks (SB) Microsystems). According to the exemplary embodiment, the SB implements the following:

contains all necessary and sufficient system parts for the functioning of each micro-system (data, code, interface);

self-assembles into "instantaneous info-conglomerates"—Smart-Bricks Instant Performances (SBIP) whenever it is necessary to perform a particular user's task, and then self-disassembles into separate microsystems;

runs under control of the Ontological Model of an enterprise subject area, also called Enterprise Ontological Model (EOM), which is adaptable to the changing conditions of a given subject area.

In another embodiment, an enterprise Information System (IS) based on a Smart-Bricks (SB) architecture includes a Control Unit configured to run an Enterprise Ontological Model (EOM); a Source component comprising an input module, a semantic detection module, and a template generation module, where the Source component is configured to store data, to receive and to output (i) the data, (ii) a data stream and (iii) an event stream; a Transformer component connected to the Control Unit, and comprising an SB search engine, an Smart-Bricks Instant Performance (SBIP) assembler, and an SBIP performer; and an Accomplisher component connected to the Control Unit, and comprising an SBIP data receiver, a user data synthesizer, and a result visualizer for rendering a result to a user.

The Source component receives a request from the user at the input interface of the input module, and/or data related to the request from an external source. The semantic detection module starts and identifies a semantics of the request data, parses the user request-related data into semantic units, identifies entities related request meanings, and finds corresponding data units in the EOM on the Control Unit. The SB search engine finds, in the EOM, SBs related to a particular micro ontological model (MOM). The SBIP assembler generates an SB Instant Performance (SBIP) out of SBs found in the EOM according to the particular generated MOM. The SBIP Performer executes the SBIP to produce a response to the user request.

The Accomplisher component's SBIP data receiver receives and corrects the response, and a User data synthesizer creates human-readable data from a machine-readable data format. The Result presenter visualizes human-readable data for the user. The Source component includes an input module, a semantic detection module, a template generation module, and has an interface for receiving the requests and an interface for outputting the response to the Transformer component.

The template generation module generates a template for SB assembling and wherein the template includes at least one micro-ontological model (MOM) based on the data units identified in the EOM. The Transformer component starts after the Source component finishes and sends the response through the output interface to the Transformer component. The input module sends user request-related data to the semantic detection module. The semantic detection module compares the data units with semantic units available in the current EOM, and based on the comparison, switches the system either to an Operating mode or to a Development mode.

When a required SB does not exists in the EOM, the Development mode is launched to provide an adaptation by creating a new version of the EOM. The creation of the new version of the EOM is activated by a command of the semantic detection module and a new SB is created in the EOM, and then the system identifies a correct meaning of a new SB in a dialogue with a user.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
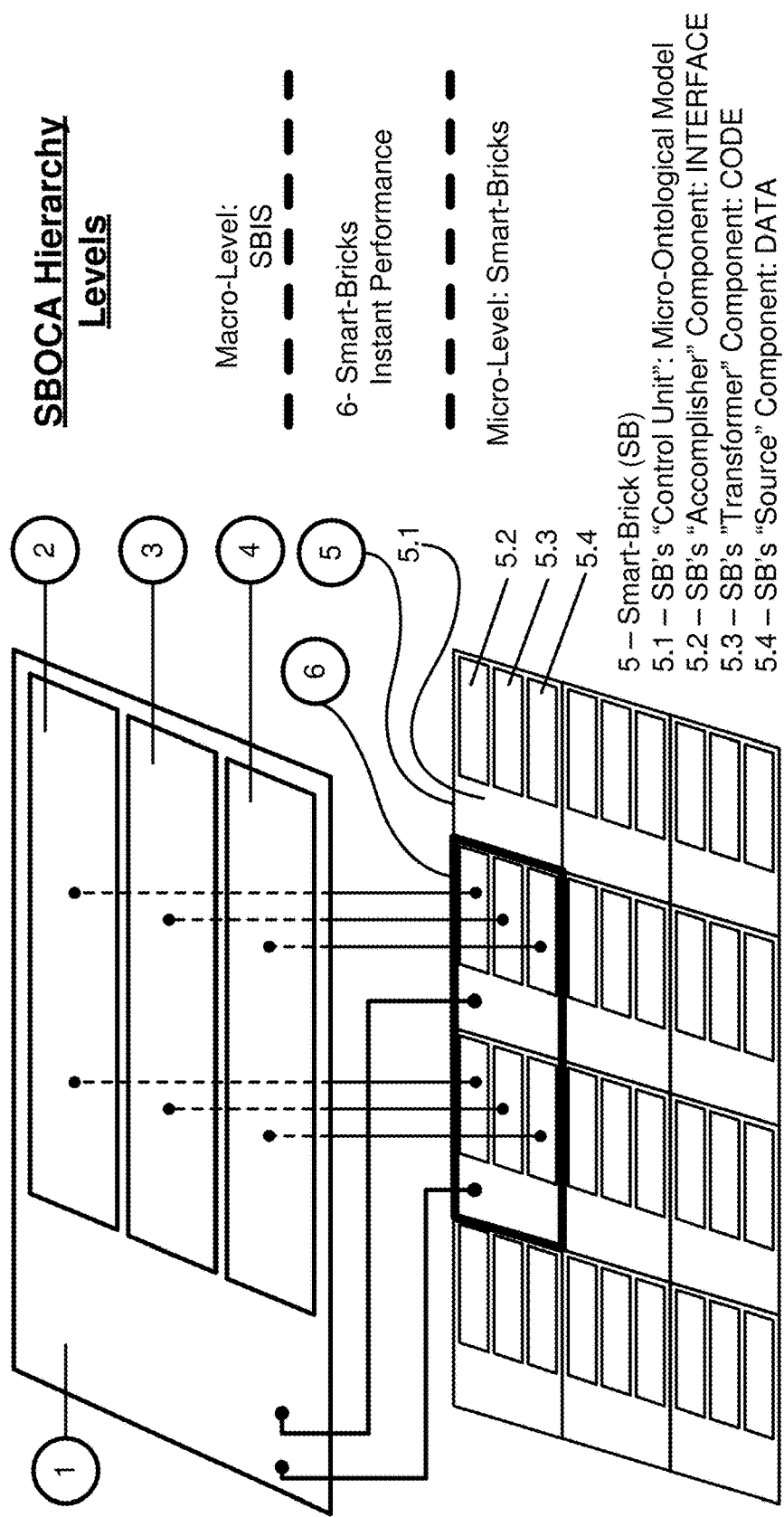
FIG. 1 illustrates a Smart Bricks (SB) information system architecture with hierarchy levels, in accordance with the exemplary embodiment.

Reference will now be made in detail to the preferred embodiments of the present invention, examples of which are illustrated in the accompanying drawings.

In an exemplary embodiment, a method, system and computer product for a Smart-Bricks Information System (SBIS) based on Smart-Bricks and Ontology-Centric Architecture, which improves functional flexibility of Enterprise Management Information Systems and their adaptability to a subject area of the enterprise, is provided.

The exemplary embodiment solves the problems of lack of adaptability and lack of flexibility of information systems. In order to provide adaptability and flexibility of the IS, the enterprise's information space is divided into a plurality of universal micro-blocks (Smart-Bricks (SB) Microsystems). According to the exemplary embodiment, the SB implements the following operations: contains all necessary and sufficient system parts for the functioning of each micro-system (data, code, interface); self-assembles into "instantaneous info-conglomerates"—Smart-Bricks Instant Performances (SBIP) whenever it is necessary to perform a particular user's task, and then self-disassembles into separate micro-systems; and runs under control of the Ontological Model of an enterprise subject area, also called Enterprise Ontological Model (EOM), which is adaptable to the changing conditions of a given subject area.

A concept of a user application, which limits or restricts the possibilities of adaptation and flexibility of the ISs, is eliminated or no longer required. The exemplary embodiment makes it possible to move away from the rigid architecture of monolithic applications and overcome the drawbacks of the SOA, by means of the flexible architecture of Smart-Bricks Microsystems and Smart-Bricks Instant Performances appearing at the right time and only for the desired operation (query, action, and event).

This ensures:
an ability to perform any necessary user actions within the information system and the current business processes of the enterprise. In other words, the IS instantaneously performs any user request to the system and the request is executed regardless of how difficult it is, whether it relates to accounting/transaction procedures, or business intelligence/decision making support;

the opportunity for the IT department to easily adapt the current state (functionality) of the information system to the external business environment changes. The system can be adapted to the changes that have already occurred, and to some prospective (predictable) changes.

The above system based on Smart-Bricks Microsystems, Smart-Bricks Instant Performances, and Enterprise's Ontological Model, provides its effective functioning to all ever-changing user requests for any changing conditions of the enterprise's business environment. The proposed system provides the following advantages to the enterprise:

elimination of material, financial and time costs for the regular redesign of the system;

elimination of the loss of time to adapt the system to any changes in the subject area (in the business environment);

increase productivity and expand the functionality of the personnel (users of the system).

The invention comprises Smart-Bricks Information System (SBIS) based on Smart-Bricks and Ontology-Centric Architecture of Information Systems (SBOCA), which improves functional flexibility of Enterprise Management Information Systems and their adaptability to the enterprise subject area. According to the exemplary embodiment, an IS architecture is implemented as a micro-level architecture, which includes many versatile micro-systems—Smart-Bricks (SB). Each of the SBs contains all the necessary and sufficient parts of information processing and establishing relationships with other system components:

Smart-Brick Instant Performance (SBIP), which executes any request to the system by generating on-the-fly conglomerates out of various Smart-Bricks;

the Enterprise's Ontological Model (EOM), which operates in real time, and have the ability to adapt for the following changes: conditions of the enterprise's business environment; and the information needs of the SBIS users.

According to the exemplary embodiment, the EOM is used as a Control Unit for executing the interaction between SBs and Smart-Bricks Instant Performances (SBIPs) to provide flexibility and adaptability of the Smart-Brick Information System. Smart-Brick is a universal micro-system in SBIS, which contains all the necessary and sufficient system components to perform a complete cycle of receiving, processing and representation of information—data, code, interface, and controls.

The EOM contains an extensive description of the concepts of the subject area (enterprise's business environment). The EOM describes an aggregate set of objects, entities, structures, functions, relationships, rules, properties, characteristics and everything else that forms the enterprise's field of information.

According to the exemplary embodiment, SBIP is an "instant show" or a "mini performance" with the participation of Smart-Bricks, created on-the-fly to perform a particular task of a user which he needs to do "right here and right now." The SBIP is created out of the right Smart-Bricks at the right time and only for the desired operation (query, actions, and events) under the management of the EOM in response to a user request.

The exemplary embodiment introduces a new type of information systems—a SBIS. The SBIS is built in the Smart-Bricks and the Ontology-Centric Architecture, linking the concepts of the Smart-Bricks, the Smart-Bricks Instant Performance and the Enterprise's Ontological Model, which together perform the dual task of improving the adaptability and flexibility of the information systems. The IT architecture of a new type—Smart-Bricks and Ontology-Centric Architecture of Information Systems (SBOCA) includes three levels of system hierarchy, built on the principle of similarity:

the macro-level (the entire information system, SBIS);

the middle level (the components of SBIS: Source, Transformer, Accomplisher, and Control Unit);

the micro-level (the set of micro-systems, Smart Bricks (SBs)).

The level of the SBIS encompasses and includes the level of SB—i.e., the SBIS is a super-system for the SBs. Both levels have the same system structure—namely, there are homogeneous functional components of the Source, Transformer, Accomplisher and Control Unit.

FIG. 1 illustrates SB information system architecture with hierarchy levels, in accordance with the exemplary embodiment. According to the exemplary embodiment, the Smart-Brick Instant Performance (SBIP) is not a permanent tangible component of the system architecture. It is a dynamic virtual element, which creates the product of information system in response to a user request. The SBIP is an "instant show" or a "mini performance" with the participation of Smart-Bricks, created on-the-fly to perform a particular task for a user, which he needs to do "right here and right now." The SBIP is created out of the right Smart-Bricks at the right time and only for the desired operation (query, actions, events, etc.) under the management of the EOM in response to a user request. The SBIP is formed by SBIP Assembler and is executed by SBIP Performer.

Figure 2:
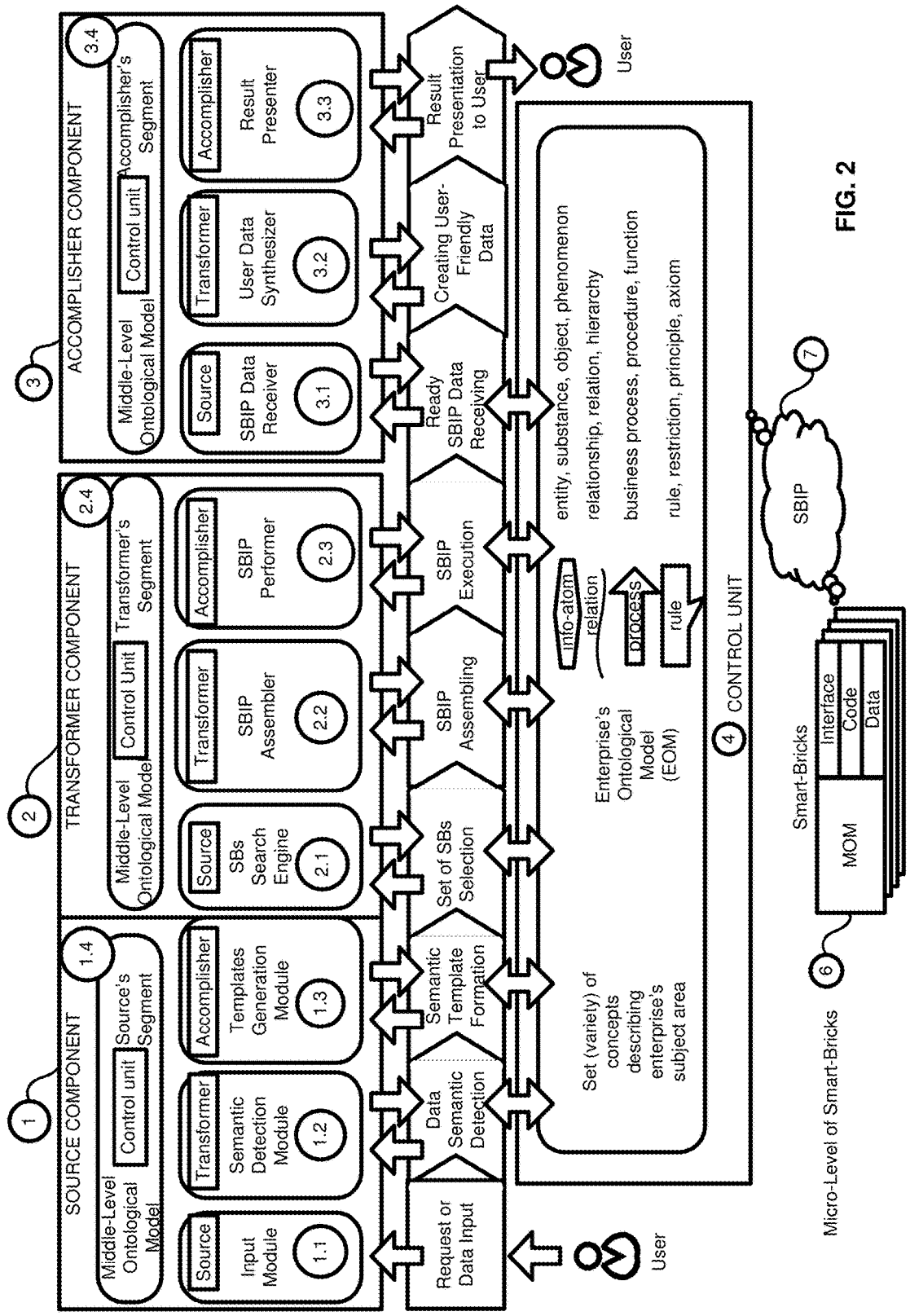
FIG. 2 illustrate basic component of the Smart Bricks Information System (SBIS), in accordance with the exemplary embodiment.

FIG. 2 illustrates a macro-level diagram including basic components of the SBIS, in accordance with the exemplary embodiment. The SBIS is the top level of the system hierarchy having the following functional component structure:

A Source—contains a source data and a mechanism for data input into SBIS;

A Transformer—receives the data from the Source, e.g., commands/queries to the system from a Control Unit, and transforms them into SBIP;

An Accomplisher (or executing unit)—receives the information from the SBIP, turns it into a desired format, and transmits the result of a system request (i.e., the information product) to the user.

A Control Unit—controls the above components using an enterprise ontological model (EOM), which contains all the concepts of the subject area.

Referring to FIG. 2 depicting the Smart-Bricks Information System, the reference numbers are as follows:

| # | Name |
| --- | --- |
| 1 | SBIS Source Component |
| 1.1 | Input Module |
| 1.2 | Semantics Detection Module |
| 1.3 | Templates Generation Module |
| 2 | SBIS Transformer Component: |
| 2.1 | SBs Search Engine |
| 2.2 | SBIP Assembler |
| 2.3 | SBIP Performer |
| 3 | SBIS Accomplisher Component: |
| 3.1 | SBIP Data Receiver |
| 3.2 | User Data Synthesizer |
| 3.3 | Result Presenter |
| 4 | SBIS Control Unit: |
| 4.1 | Enterprise's Ontological Model |

| # | Name |
|---|---|
| 5 | SBIS Main Process |
| 6 | Smart-Bricks (belongs to Micro-Level) |
| 7 | Smart-Bricks Instant Performance, SBIP |

The main objective of the Source component is receiving basic data, and preparation of this data for the launch of the SBIP in the Transformer component. The SBIS Source Component contains source data and a mechanism for data input into SBIS. According to the exemplary embodiment, the source data is represented as an array of a transaction data (such as an enterprise resource planning (ERP) data) and the data flow from the sensors/events (such as data from Supervisory Control and Data Acquisition Systems (SCADA), or from Complex Event Processing (CEP)).

Note that all data processed in the SBIS exists only at the micro-level consisting of SB-micro-systems. Data for each SB is located in the SBIS Source component. The SBIS Source component consists of tree modules:

In addition to the mechanism of receiving the input data, the Input Module includes a mechanism of natural language processing (NLP). The data input mechanism provides user's input by keyboard or by voice, by receiving a formatted data from electronic devices and systems. As an option, it is possible to place a request (link) to receive the inputs from external sources instead of keyboard or voice data.

The Semantic Detection Module identifies the semantics of the input data and compares the meaning contained in this data with the semantic units available in the enterprise ontological model (EOM).

The Template Generation Module creates a template matrix out of the selected semantic units. This template is needed for running the SBIP.

Figure 4:
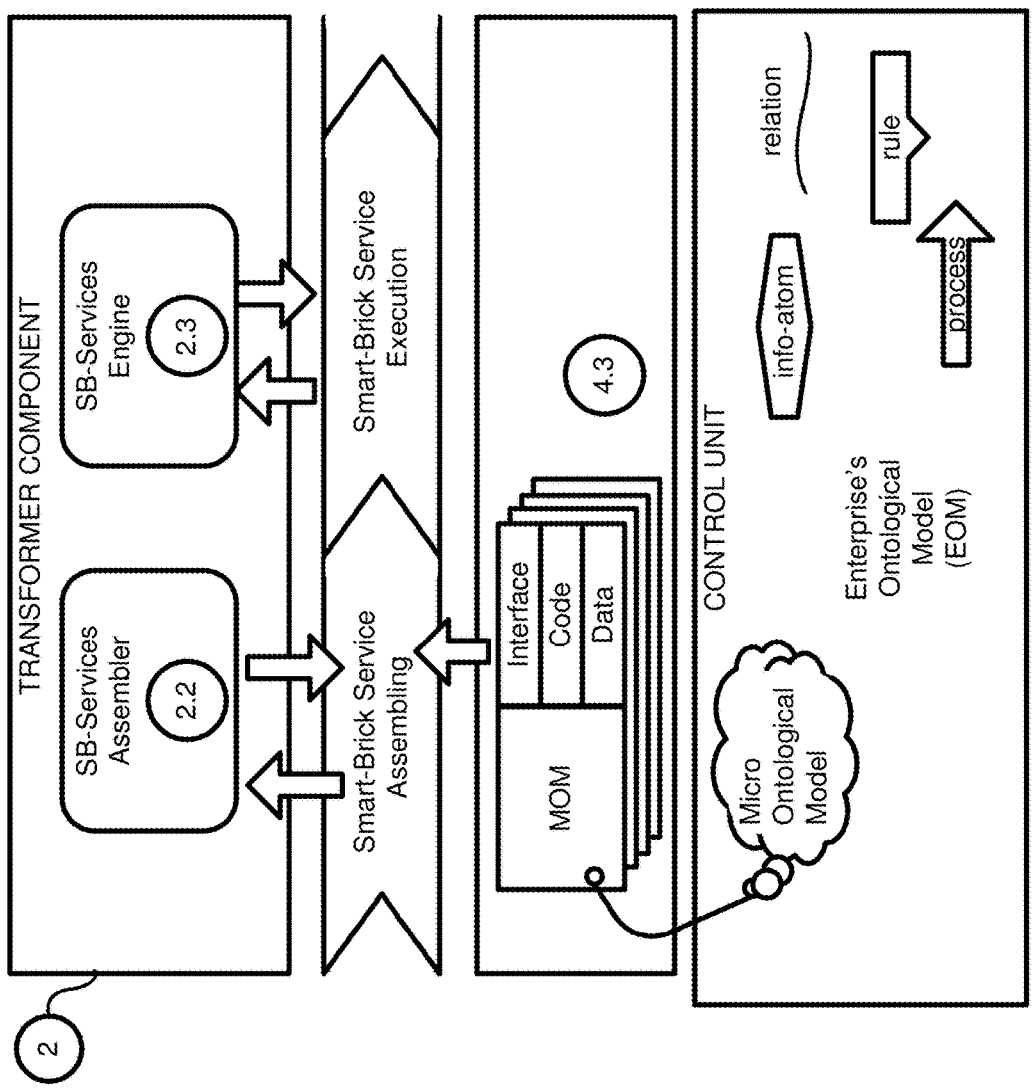
FIG. 4 illustrates the SBIS Transformer component, in accordance with the exemplary embodiment.

The SBIS Transformer Component is depicted in FIG. 4. The main objective of the SBIS Transformer component is the formation of the SBIP out of the set of SBs under the management of the EOM.

According to the exemplary embodiment, the SB concept is used to ensure the adaptability and flexibility of the system by splitting the information space into a variety of universal SB-micro-systems combined into "SBIP micro-shows", and to performing these SBIPs on request. The SBIS Transformer Component receives the data, queries/requests, etc. from the Source Component, receives the commands from the Control Unit and transforms them into SBIP. In other words, this component converts the source data into meaningful information for the system response to a user. It works under control data from the Control Unit (see description of EOM below).

The SBIS Transformer Component consists of three modules:
  SBs Search Engine (SSE), which searches appropriate SBs containing semantics according to semantic template generated by Template Generation Module. The SSE analyzes the input data prepared in the Source Component, recognizes semantics of these data (the meaning of the input commands and queries from the user), and prepares meaningful data suitable for SBIP processing;
  SBIP Assembler (SA) assembles specific SBIP instances out of several required SBs containing the required meaning, using semantic template from the SRA, and the control data from the EOM;

SBIP Performer, which starts and executes the SBIP and sends the result to the Accomplisher Component.

The main objective of the SBIS Accomplisher Component is to complete the main SBIS function and to transfer the result (information product in a form of response) to the user. The SBIS Accomplisher Component receives the information from the Transformer (from the synthesized instance of SBIP) containing the system's answer in the formal notation (for example, in XML). Then, the Accomplisher transforms it into a finished form convenient for the user's perception (i.e., text, voice, sound, graphics or 3D-image) and transmits it to the peripheral device (screen, loudspeakers, holographic projector, etc.).

The SBIS Accomplisher Component includes SBIP Data Receiver, User Data Synthesizer, Result Presenter and Control Unit as segment of Enterprise's Ontological Model (EOM). The SBIS Control Unit controls the above components. The EOM contains a comprehensive description of the concepts of subject area (enterprise's business environment). The EOM describes an aggregate set of objects, entities, structures, functions, relationships, rules, properties, characteristics and everything else that forms the enterprise's field of information.

Some examples of the concepts described in EOM are:
  info-atoms (the entities, concepts, phenomena, facts, objects and subjects); their meanings, i.e. semantics of grammar elements of natural and artificial languages used in the system;
  info-molecules (SB-micro-systems), assembled out of the info-atoms;
  processes (procedures, operations, actions, events, and associated roles/functions of the info-atoms);
  relationships between the info-atoms and info-molecules;
  rules, axioms and constraints for info-atoms, processes and relationships.

The EOM contains the semantic elements that describe all info-atoms with their attributes and relationships and ensures conformity between these info-atoms and natural language concepts. Thus, it reflects the diversity of the semantic domain (enterprise business environment) both in natural language (for the user), and in the formal notation (for the system). In other words, this is a virtual representation of the enterprise's real world in the necessary and sufficient detail. It means that every real material object of enterprise corresponds to its informational virtual copy. Every detail, device, instrument, machine, material, product, employee—just about everything constituting the enterprise as a business system, is reflected in this virtual component of the SBIS. Each material object has an ID tag, using which the SBIS monitors the position of the object in the technological cycle. The SBIS receives information by similar tags from various sources (i.e., an Enterprise Intranet of Things similar to the Internet of Things).

The SBIS Main Process performs all necessary procedures from the Data Input to the Result Delivery, by means of above described Components. The SBIS Main Process consists of such processes as Data Input, Data Semantics Detection, Semantic Template Formation, Set of SBs Selection, SBIP Assembling, SBIP Execution, Ready SBIP Data Receiving, User-Friendly Data Creating, and Result Presentation to User.

According to the exemplary embodiment, the Smart-Brick's conglomerate performs a complete cycle of receiving, processing and representation of information within a micro-level of the system. It includes the SB Source Component (i.e., data), the SB Transformer Component (i.e., code), the SB Accomplisher Component (i.e., interface) and the SB Control Unit (i.e., a Micro Ontological Model (MOM)). The Smart-Brick Instant Performance (SBIP) is an on-demand temporary assembly of the SBs, which performs the one-to-one process to provide one answer for one request. The SBIP carries out the request and then breaks up into different SBs or remains in assembled state to repeat the request processing.

Figure 3:
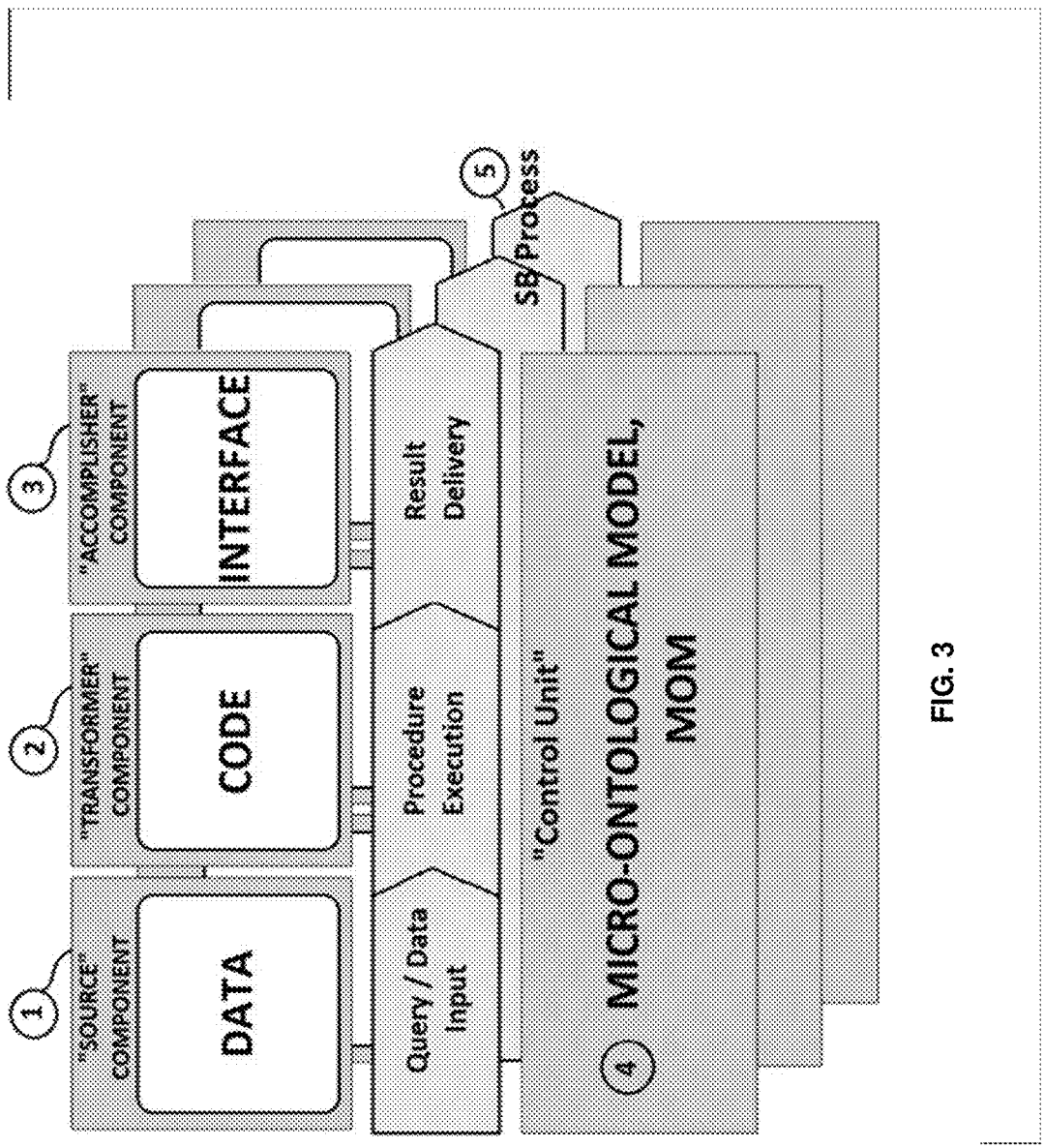
FIG. 3 illustrates a micro-level of the SBIS, in accordance with the exemplary embodiment.

FIG. 3 illustrates a micro-level of the SBIS, in accordance with the exemplary embodiment. FIG. 3 depicts a lower level of the system as a set of SBs, an microsystems under the control of the main ontological model (EOM) by means of the SBIP Assembler and the SBIP Performer. The SBIPs are created to provide answers to user queries. All of the SBs have the same functional-component structure that includes the Source, the Transformer, the Accomplisher and the Control Unit:

The Source works with the input data (voice, text, data from the database, from sensors by SCADA/enterprise Intranet of things, etc.), and transmits them to the Transformer;

The Transformer is a programmable module executing the functionality of specified SB. It receives data from the Source and transmits the processed data to the Accomplisher;

The Accomplisher is an interface of the SB, which accomplishes/terminates the function of the SB and transmits the result of a particular SB further into the system for use by the next processing step;

The Control Unit is an ontological description of a small portion of the Enterprise's Ontological Model. It is a domain under the responsibility of the particular SB, namely, micro-ontological model (MOM).

Referring to FIG. 3, the reference numbers are as follows:

| # | Name | Description |
|---|------|-------------|
| 1 | "Source" Component | Data |
| 2 | "Transformer" Component | Code |
| 3 | "Accomplisher" Component | Interface |
| 4 | "Control Unit" | Micro Ontological Model |
| 5 | SB Process | Functional hierarchy of operations to get the result |

According to the exemplary embodiment, there are three modules providing input from user to the SBIS:

Input Module, which contains, in addition to the mechanism of receiving the input data, the mechanism of natural language recognition (Natural Language Processor, or NLP);

Data input mechanism provides user's input by keyboard or by voice, by receiving formatted data from electronic devices and systems. As an option, instead of data it is possible to place a request (link) to receive the request from external sources;

Semantic Detection Module, which identifies the semantics of the input data, and compares the meaning contained in this data with the semantic units available in the enterprise ontological model (EOM); and Template Generation Module, which creates the template matrix based on the selected semantic units.

The SB component Source (data) works with the input data. The data residing in the SB is related only to the particular micro-area or a micro-event, which are described within a Micro Ontological Model (MOM) of this SB. For example, the SB "Oil Rig" will contain data "a list of all Oil Rigs of the oil enterprise", but will not contain, for example, data on repair crews servicing these Oil Rigs. The other SB called "Repair crews" will contain such a data. In traditional DBMS for the similar functional area "Drilling Facilities of the Oil Enterprise" it is necessary to rigidly specify in the objects model the "rig" and the "crew." In the SBIS, such model of data does not exist.

Accordingly, there is no such a strong relationship. The necessary relationship is temporarily created only within a particular "mini-performance" of the SBIP, for example, in response to request "which repair crews worked on the oil rigs?" This SBIP created on-the-fly carries out the request and, then, breaks up into different SBs (or remains in assembled state to be repeated for the same request). For event data (for example, from SCADA sensors), the SB uses a paradigm of Complex Event Processing (CEP), which instead of the function "store and process" carries out the function "process on the fly, and then if it is necessary—store." The SB can be connected to a stream of events within some SBIP, obtain data from this stream, process request on-the-fly according to the program code. The SB can provide the received result via the interface to the user, and if it is necessary, the SB can keep the result for the subsequent use.

The SB component Transformer (code) describes actions/procedures, which SB performs within the MOM (micro ontological model) using the concepts described in it. For example, the SB "Oil Rig" contains simple code allowing to carry out actions over an object "Oil Rig" with the use of data "The list of oil rigs of the enterprise": to create (insert) a record, to change (update) a record, to remove (delete) a record about the object "Oil Rig." The code, for example, can execute actions "create new Oil Rig," "take Oil Rig out of service." In the development mode, the code can be created by the programmer, taken from the library or copied from another SB and modified. For simple cases, the code can be automatically created by automated procedures. For example, the procedures can be created from the mathematical libraries that contain the calculation procedures (e.g., "to calculate the average consumption of diesel fuel in the oil rig"). It can be written down in the object properties of the SB's ontological model (MOM).

The SB component Accomplisher (interface) completes the execution of the SB functions, and transfers the result further to the system upon execution of the procedure. The component is an interface, and can represent a graphic, a semantic, an XML structure, etc. It is possible to use "programmable only" interface that works without human intervention, for example, it communicates with SCADA or with an "enterprise's intranet of things."

The SB component "Control Unit" (micro-ontological model) controls interaction between all components. It represents the micro-ontological model (MOM) of a small part of subject area for the particular SB.

According to the exemplary embodiment, the SBIS is built using the Smart-Bricks and Ontology-Centric Architecture, linking the concepts of Smart-Bricks, Smart-Bricks Instant Performance, and Enterprise's Ontological Model, which together perform the dual task of improving the adaptability and flexibility of information systems. To perform this task, SBIS operates in two modes:

A) An operating mode, which provides SBIS's flexibility in current conditions of enterprise management (transactions, analytics, and decision support). All the usual user requests to the system (arbitrarily complex and diverse) performed in this mode under constant external conditions;

B) Development mode is needed for SBIS's adaptability to changing external conditions. This mode changes the EOM, and the "virtual image" of the enterprise is adapted to the changing reality which. According to the changing environmental conditions, a new status of information system is formed. The new status supports the new version of an Operating mode. These changes in the EOM may be dictated by factors both internal and external.

According to the exemplary embodiment, the basic functions and output of the SBIS are as follows. The SBIS has two principal functions and the two corresponding modes:

The main function is to provide information on request, performed in an operating mode. This mode implies the possibility of making any requests by the user, and receiving meaningful, adequate answers from the system, under conditions of a business environment (subject area), reflected in the current version of the EOM;

The additional function is to execute commands on related to development of the system, performed in the development mode. This mode involves a reaction to the need to adapt the SBIS to changing conditions of the business environment (subject area). The SBIS adaptation is produced by changes in the EOM, by creating a new version of the ontological model.

As an additional possibility, if necessary, is to clone the EOM or its part into another information system. Note that the EOM can be used outside the SBIS. According to one exemplary embodiment, it is possible to use a mode with a special option of deploying the system from scratch—an "Egg option." The "Egg option" provides for an ability to clone the system by performing the process of self-development of SBIS's "info-embryo." This is a simulation of accelerated system evolution, the deployment of the system from a functional core (including the source, transformer, accomplisher, and control unit), towards its functional peripherals (including auxiliary, additional, and supporting components). The EOM receives information from the environment that is different from that in which it was formed (e.g., in this case it was formed as a model of the oil refinery enterprise), and then adapted to the new business conditions. For example, it would be useful to run the "Egg option" in case of a new version of the oil refinery's information system development in a different geographic region, or even to create information system for the enterprises in other sectors—such as a waste recycling plant.

Figure 5:
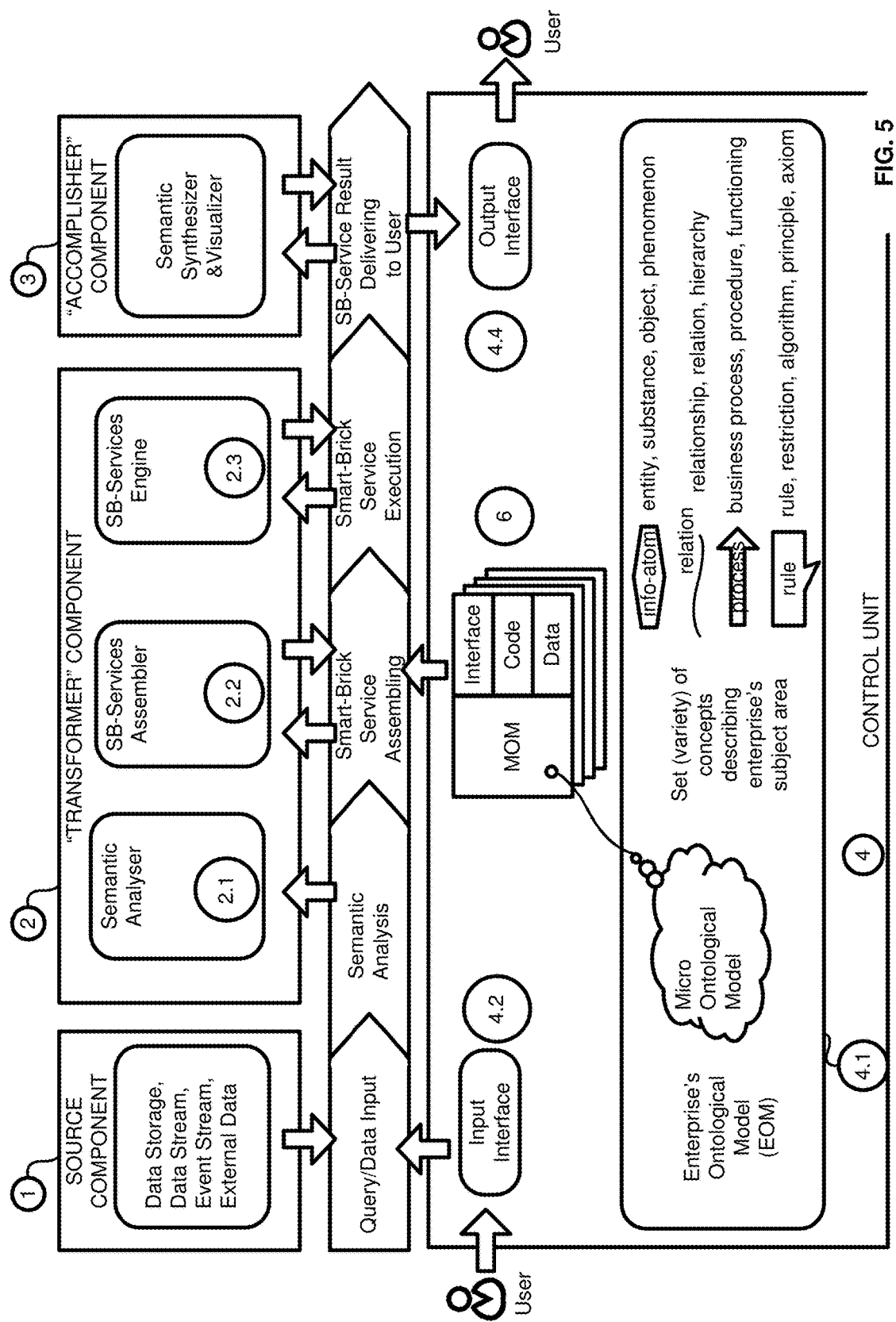
FIG. 5 illustrates an example of the SBIS architecture with a micro-ontological model, in accordance with the exemplary embodiment.

FIG. 5 illustrates an example of the SBIS architecture with a micro-ontological model, in accordance with the exemplary embodiment. As discussed above, the concept of Smart-Brick (SB) is an atomic micro-system (SB) as a part of a macro-system (SBIS) containing minimum necessary and sufficient system components to perform a full cycle of receiving a request, processing and presenting a result (information) to the user. These components are the Source (1), the Transformer (2), the Accomplisher (or executing) (3) and the Control unit (4). These components are data (Source component), program code (Transformer component), interface (Accomplisher component), and controls (Control unit). In other words, the Smart-Brick is the miniaturized information system containing all necessary and sufficient elements for work with the micro-area of the information space of the enterprise defined for this particular Smart-Brick. A set of all Smart-Bricks forms the lower level of the system hierarchy in SBIS.

Three components the source, the transformer and the accomplisher are connected through the fourth component, the control unit with the enterprise ontological model (EOM). The control unit (4) employs an ontological micro-model (MOM) of a small part of the subject area/business environment for a particular SB. Each of the SB's components mentioned above can change accordingly to the changes in the EOM, because all the MOMs of all the SBs are connected with the EOM.

For example, an SB "Oil Rig" would contains:
a source, data (list of all oil rigs of the oil enterprise);
a transformer, a program code which works with the data;
an accomplisher, an interface (graphic/voice/semantic);
a control unit, ontological micro-model named "drilling facilities of the oil enterprise."

In this example of the SB "Oil Rig" the control unit component contains a micro-model of the ontology "Enterprise's Drilling Facilities." Then, to perform procedures such as "create a new Oil Rig," "repair the existing Oil Rig," "take the Oil Rig out of service," it is possible to either use a single SB, or use SBIP generated out of several SBs. Procedures "to create a new Oil Rig," "take the Oil Rig out of service" can be performed within the "transformer component" (code) of the SB "Oil Rig." The procedure "repair the existing Oil Rig" may be performed by the SBIP "Current Repair of the Oil Rigs," which binds the SB "Repair Workshop" and the SB "Oil Rigs," which contains the particular object to be repaired the "Oil Rig No. 001."

Another option of repair work is when one SBIP is bound to several SB "Accidents," "Oil Rig," "Repair Workshop," and "Repair Team." When the user gives a command "Create a new Oil Rig," the following procedures occur:

Step 1. When the user submits voice or text command "To Create a New Oil Rig," the command is accepted by the Input Module, which sends data to a Natural Language Processor for data interpretation (transformation) from a natural language to the formal language suitable to the system;

Step 2. The Semantic Detection Module (SDM) starts and identifies the semantics of the "Create a new Oil Rig" data, highlights the entities "create," "Oil Rig," and compares these meanings with the semantic units available in the ontological model (EOM). The result of the comparison switches the system either to the Operating mode or to the Development mode;

Step 3. If it is determined that the command refers to the Operation mode (i.e., the current version of the EOM has all the necessary elements to execute the command "Create new Oil Rig"), the SDM finds corresponding SB "Oil Rig" in EOM, and sends this fact to the Semantic Template Generation Module (STGM), described below;

Step 4. If it is determined that the command refers to the Development mode (i.e., the current version of the EOM does not have all the necessary elements to execute a command), the procedure is implemented:

Using the "Oil Rig" example, a command "Create new Station" is received. This command contains the element "Create," and the element "Station" instead of the "Oil Rig." Because the element "Station" does not exists in the model, the Development mode has to be launched. This mode creates the element "Station" in the EOM, and then identifies its correct meaning in a dialogue with a user—say, a "railway station" or a "gas station." It is possible to clarify the request, if there are several objects, in which the title contains the term "station" (e.g., sub-station, radio station, metro station, etc.);

Step 5. Semantic Template Generation Module (STGM) creates the template matrix out of the semantic units selected by SDM in Step 3, to run the SBIP in the next step performed in the SBIS Transformer component;

Step 6. Within the Transformer component, the SB's Search Engine (SSE) searches for an appropriate SBs containing meanings according to the semantic template created by STGM. The SSE analyzes the "Create new Oil Rig" data prepared in the previous step, recognizes meaning of this command and prepares meaningful data suitable for further SBIP processing;

Step 7. The SBIP Assembler assembles specific SBIP instances out of several required SBs containing the required meaning, using semantic template from the SRA and the control data from the EOM. For example, the required SBs can be the only SB "Oil Rig," or in case of the command "Repair the Oil Rig," the SB can be assembled out of the SBs "Accidents," "Oil Rig," "Repair Workshop," and "Repair Team";

Step 8. The SBIP Performer starts and executes the SBIP "Creation of a New Oil Rig," and then sends the result to the Accomplisher component of the SBIS; and Step 9. The SBIS Accomplisher component receives the information from the SBIP Performer (i.e., the SBIP instance "Creation of a New Oil Rig") containing the system's answer in the formal notation (for example, in XML). Then, the Accomplisher transforms it to the final form convenient for user's perception (i.e., text, voice, sound, graphics or 3D-image) and transmits it to the peripheral device (i.e., screen, loudspeakers, holographic projector, etc.).

Note the SB can be created, modified, eliminated during its life cycle. The properties of a particular SB can be inherited, that is, each SB can be built based on the previous version and can be, advantageously, developed further.

Figure 6:
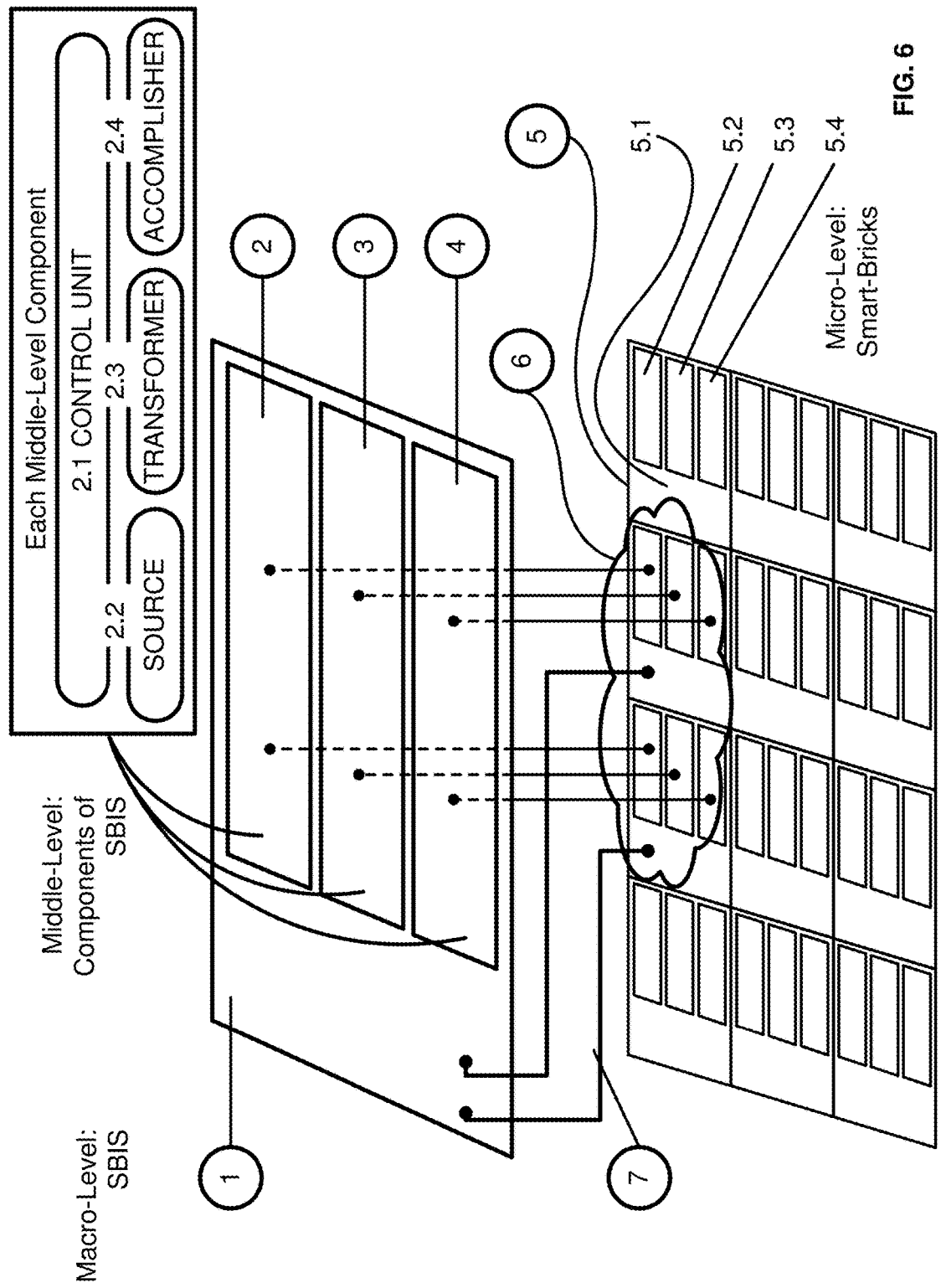
FIG. 6 illustrates a structure of middle-level components of the SBIS, in accordance with the exemplary embodiment.

FIG. 6 illustrates a structure of middle-level components of the SBIS, in accordance with the exemplary embodiment. The middle level components 2, 3 and 4, each have a control unit (2.1 in this example), source 2.2, transformer 2.3 and accomplisher 2.4.

Figure 7:
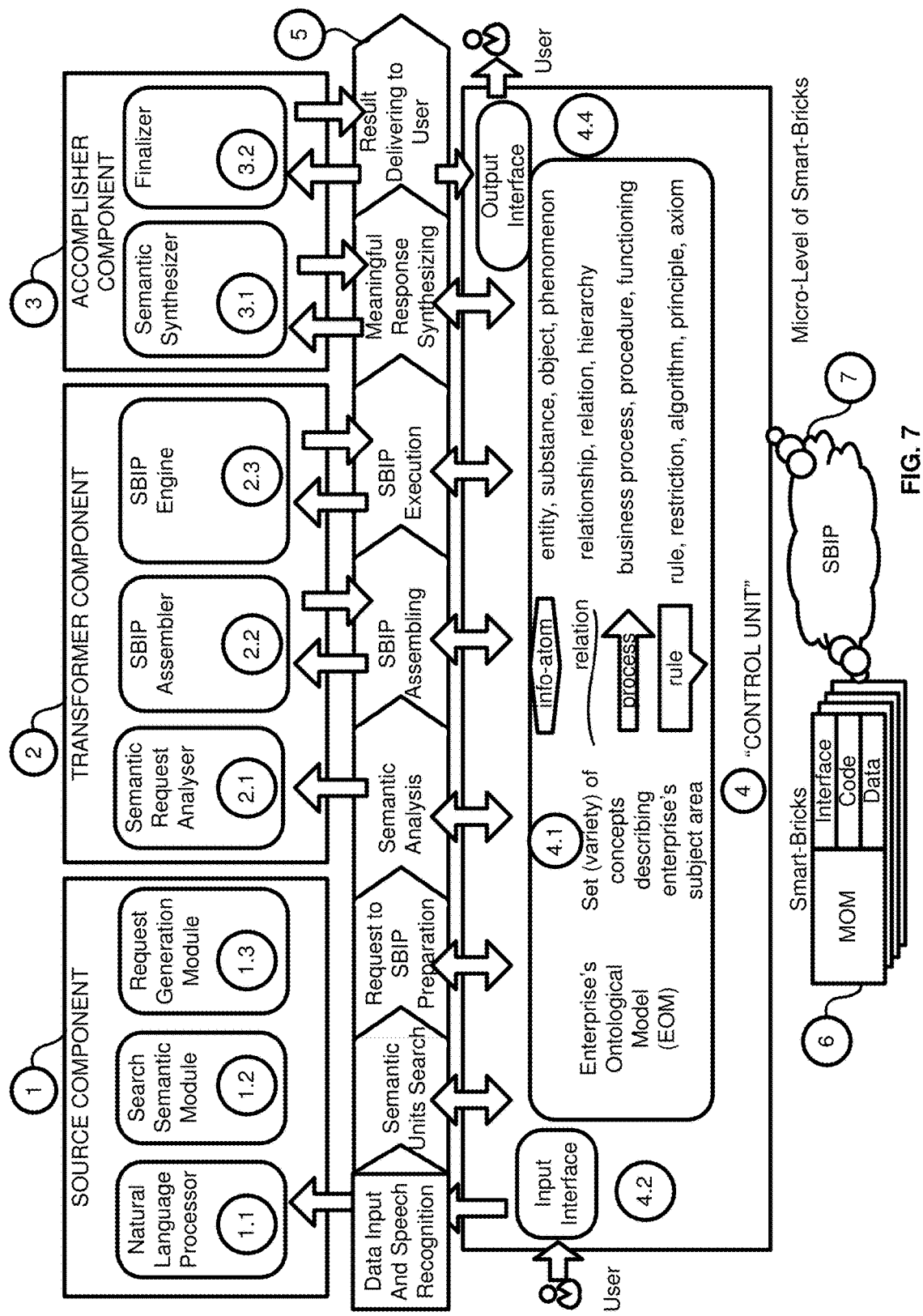
FIG. 7 illustrates a detailed structure of Smart-Bricks Instant Performance (SBIP), in accordance with the exemplary embodiment.

FIG. 7 illustrates a detailed structure of SBIP, in accordance with the exemplary embodiment. This structure is configured to implement the steps 1-9 discussed in the above example.

Figure 8:
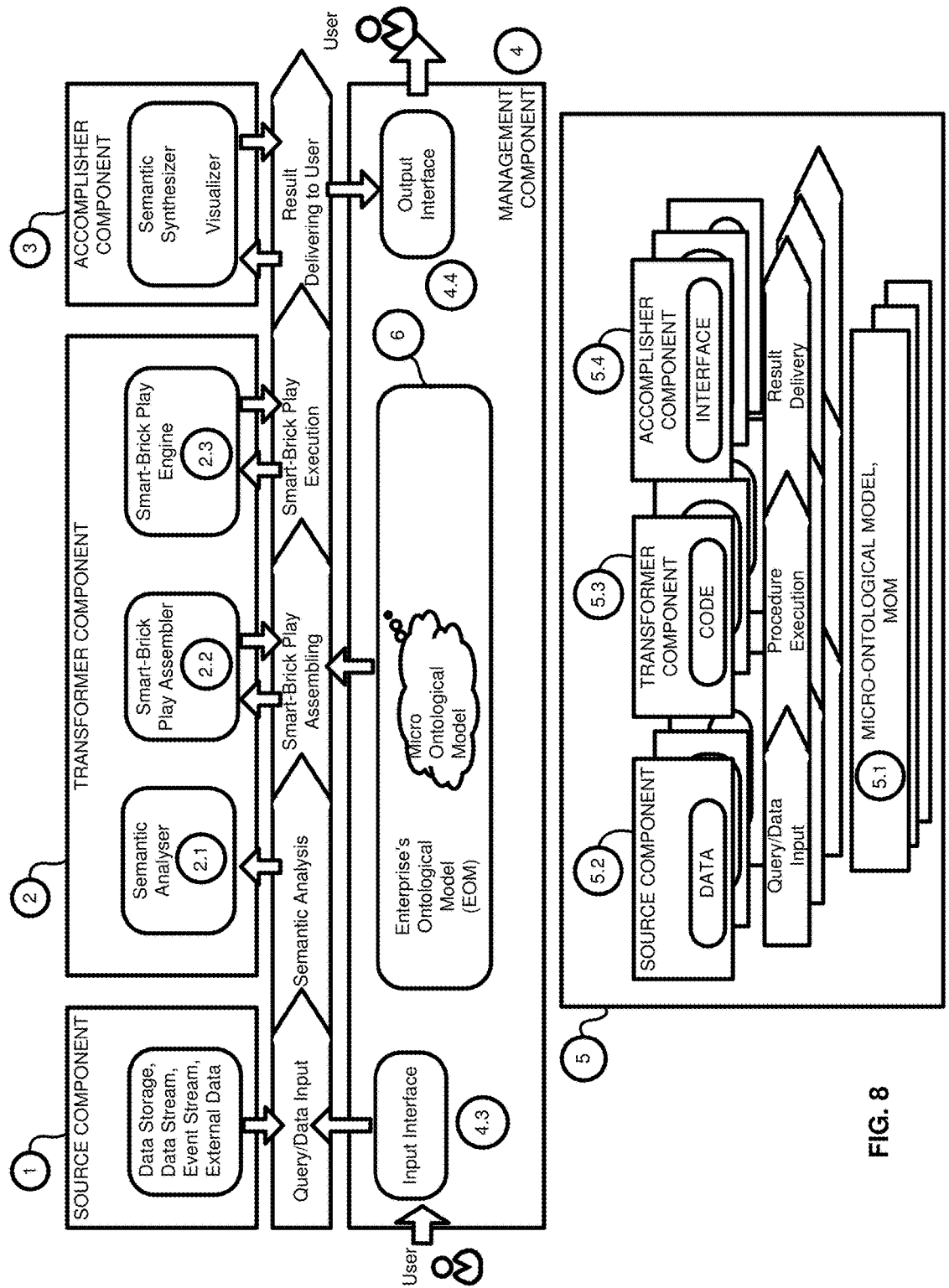
FIG. 8 illustrates a structure of a micro-ontological model employed by a control unit, in accordance with the exemplary embodiment.
Figure 9:
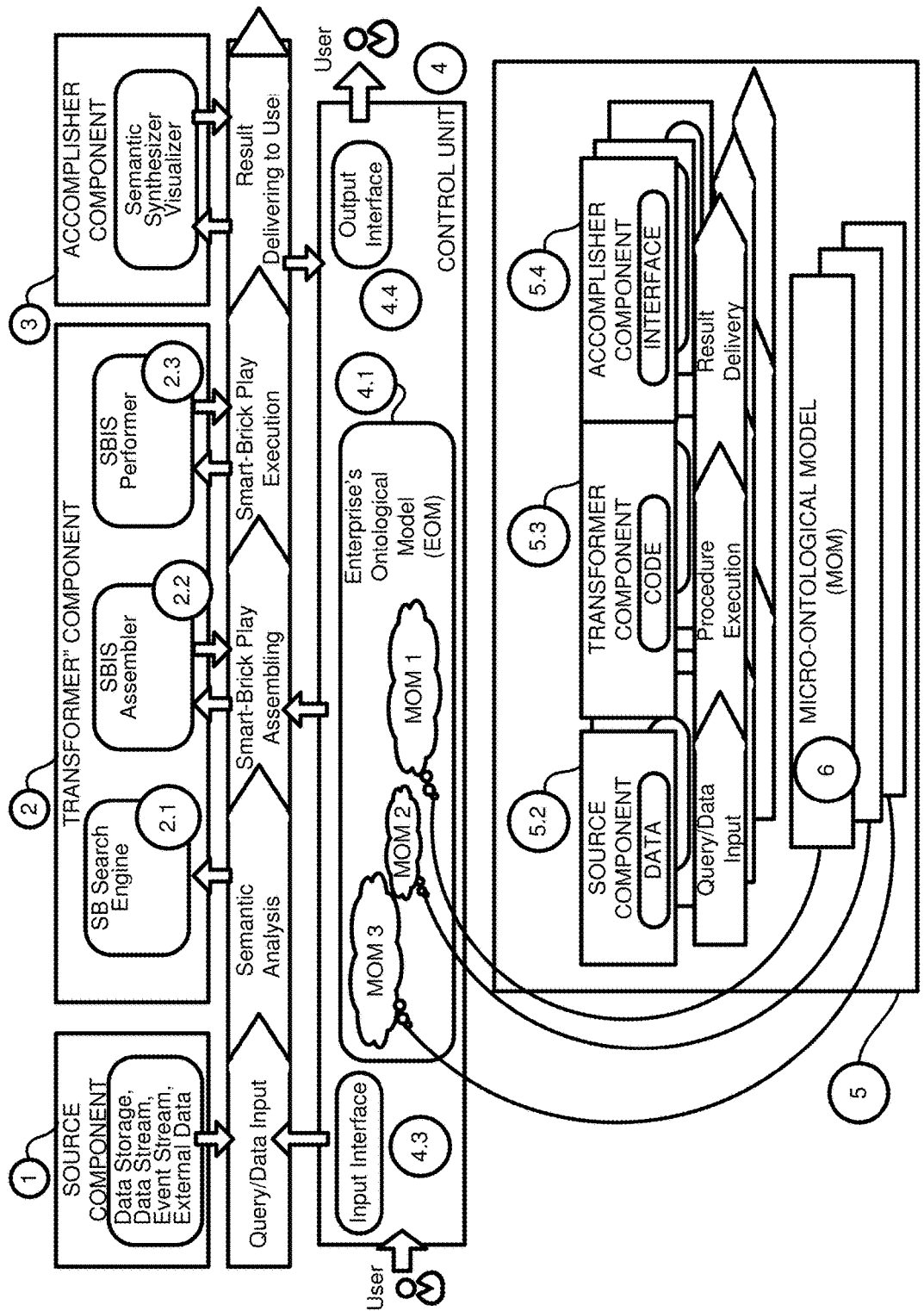
FIG. 9 illustrates how the different Micro Ontological Models (MOMs) are used according to user inputs in the EOM.
Figure 10:
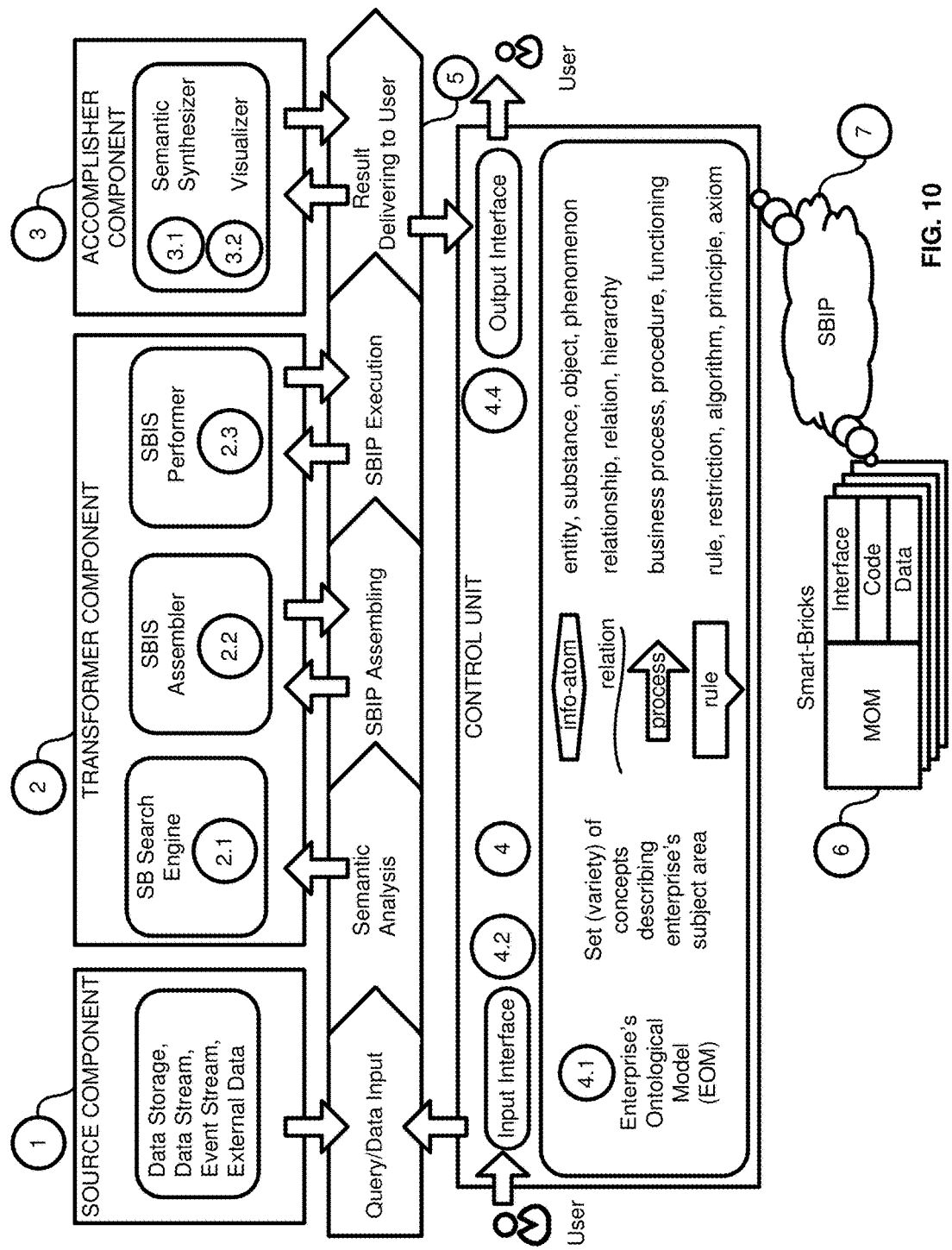
FIG. 10 illustrates how Smart-Bricks Instant Performance (SBIP) is used within the SBIS.

FIG. 8 illustrates a structure of a micro-ontological model employed by a control unit, in accordance with the exemplary embodiment. The control unit 4 employs an ontological micro-model (MOM) 5.1 of a small part of the subject area/business environment for a particular SB. Each of the SB's components mentioned above can change accordingly to the changes in the EOM 4.1, because all the MOMs of all the SBs are connected with the EOM 4.1. FIG. 9 illustrates how the different MOMs 5.1 are used according to user inputs in the EOM 4.1. FIG. 10 illustrates how Smart-Bricks Instant Performance (SBIP) depicted in FIG. 7 is used within the SBIS architecture. The SBIP 7 is generated based on the SBs 6 using MOM created according to user requests.

Figure 11:
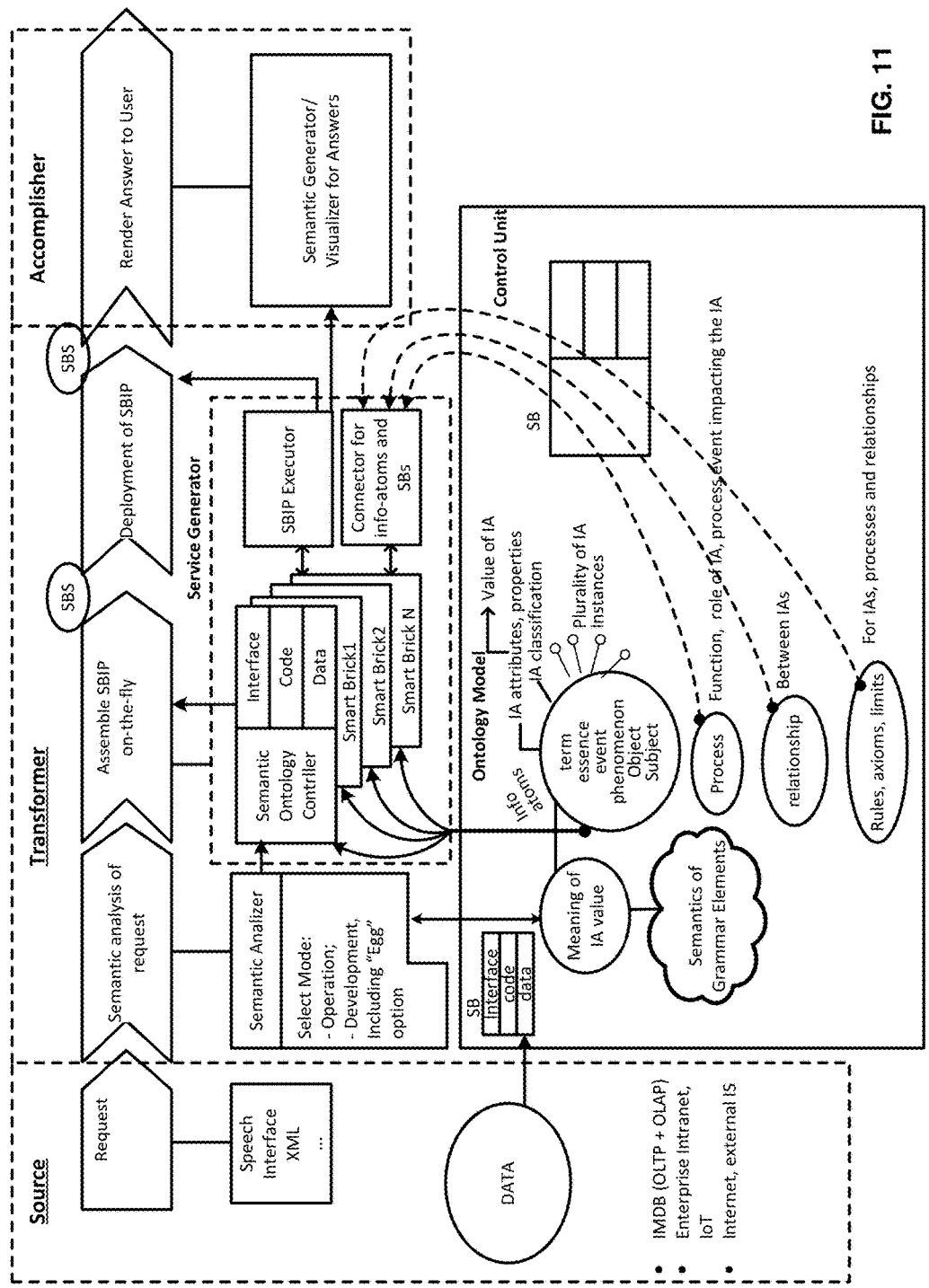
FIG. 11 illustrates how the user request is processed through the SBIS using info-atoms, in accordance with the exemplary embodiment.
Figure 12:
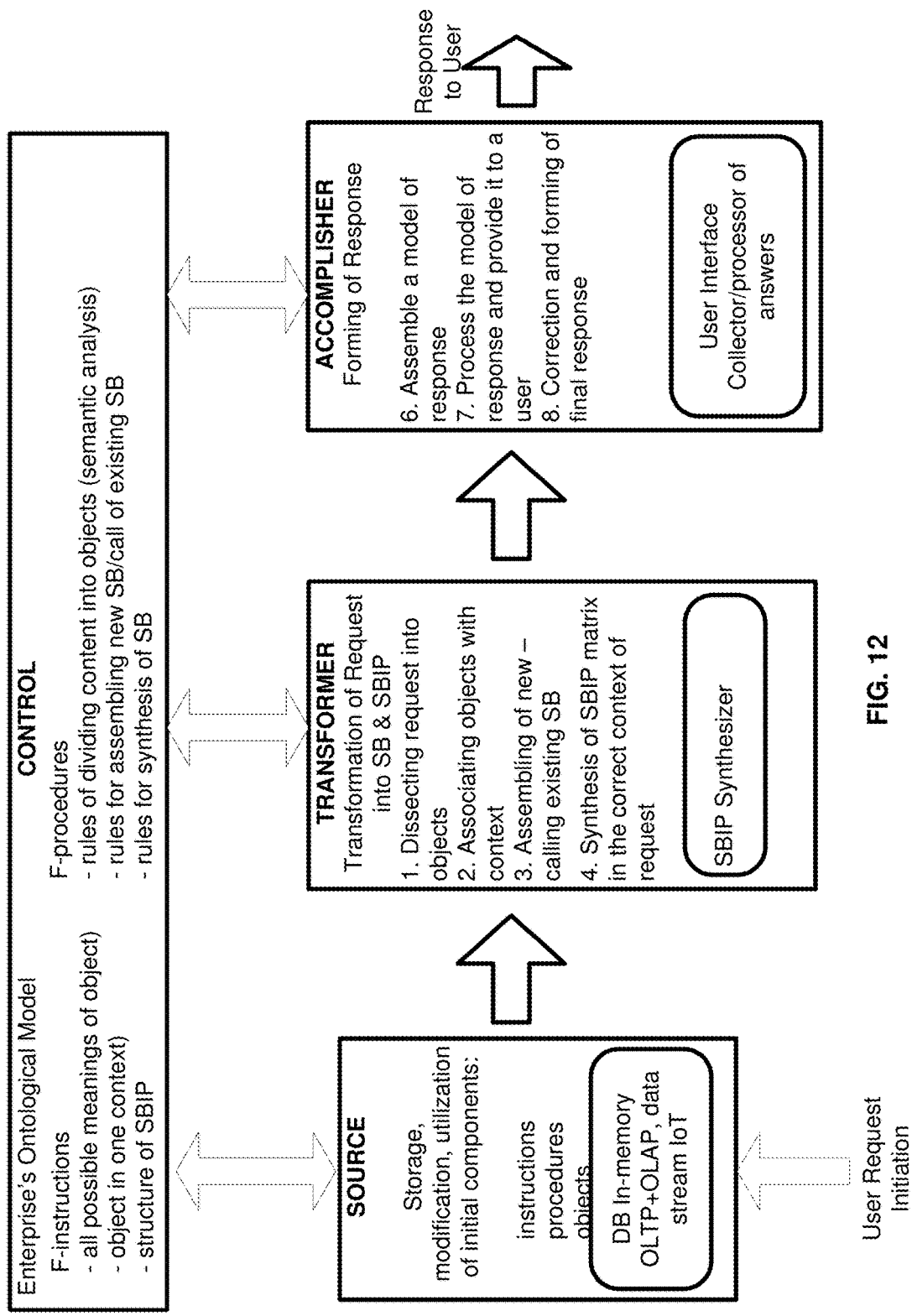
FIG. 12 illustrates an example of a request processing through SBIS.

FIG. 11 illustrates how the user request is processed through the SBIS using info-atoms, in accordance with the exemplary embodiment. In this exemplary architecture, the following abbreviations are used:
IA—info-atom;
SB—Smart-Brick;
SBIP—Smart-Brick Instant Performance.

According to the exemplary embodiment, the SB concept is used to ensure the adaptability and flexibility of the system by splitting the information space into a variety of universal SB-micro-systems combined into "SBIP micro-shows", and to performing these SBIPs on request. The SBIS Transformer Component receives the data, queries/requests, etc. from the Source Component, receives the commands from the Control Unit and transforms them into SBIP. In other words, this component converts the source data into meaningful information for the system response to a user. It works under control data from the Control Unit (see description of EOM above).

Some examples of the concepts described in EOM are:
info-atoms (the entities, concepts, phenomena, facts, objects and subjects); their meanings, i.e. semantics of grammar elements of natural and artificial languages used in the system;
SB-micro-systems, assembled out of the info-atoms;
processes (procedures, operations, actions, events, and associated roles/functions);
relationships and communications between the info-atoms and info-molecules;
rules, axioms and constraints for info-atoms, processes and relationships.

The EOM contains the semantic elements that describe all info-atoms with their attributes and relationships and ensures conformity between these info-atoms and natural language concepts. Thus, it reflects the diversity of the semantic domain (enterprise business environment) both in natural language (for the user), and in the formal notation (for the system). In other words, this is a virtual representation of the enterprise's real world in the necessary and sufficient details. It means that every real material object of enterprise corresponds to its informational virtual copy. Every detail, device, instrument, machine, material, product, employee—just about everything constituting the enterprise as a business system—is reflected in this virtual component of the SBIS. Each material object has an ID tag, using which the SBIS monitors the position of the object in the technological cycle.

Figure 13:
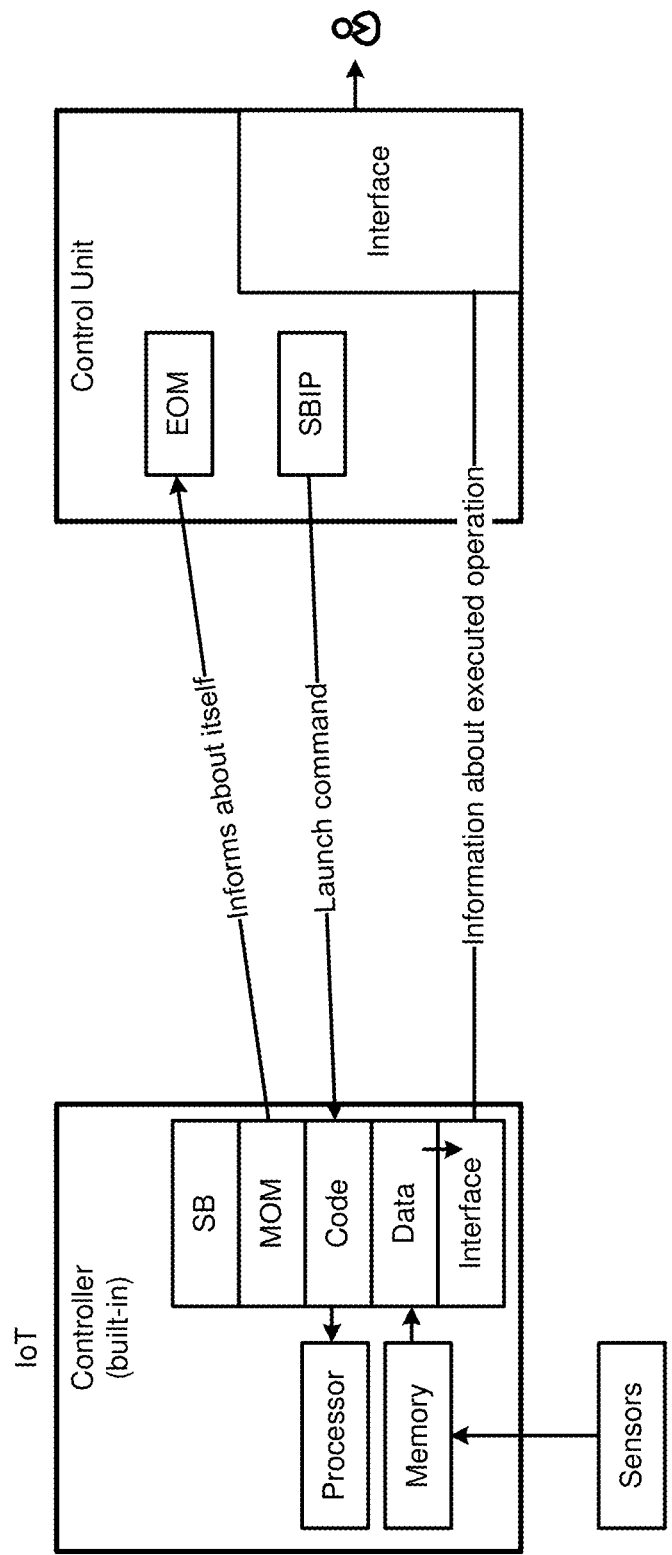
FIG. 13 illustrates an example of using an SB for an electric battery controller.

FIG. 13 illustrates an example of using an SB for an electric battery controller. The controller has an SB implemented on it. The SBIP module is launches on the Control unit. Then the EOM creates a MOM instance generated for the electric battery controller based on data provided from the SB.

Figure 14:
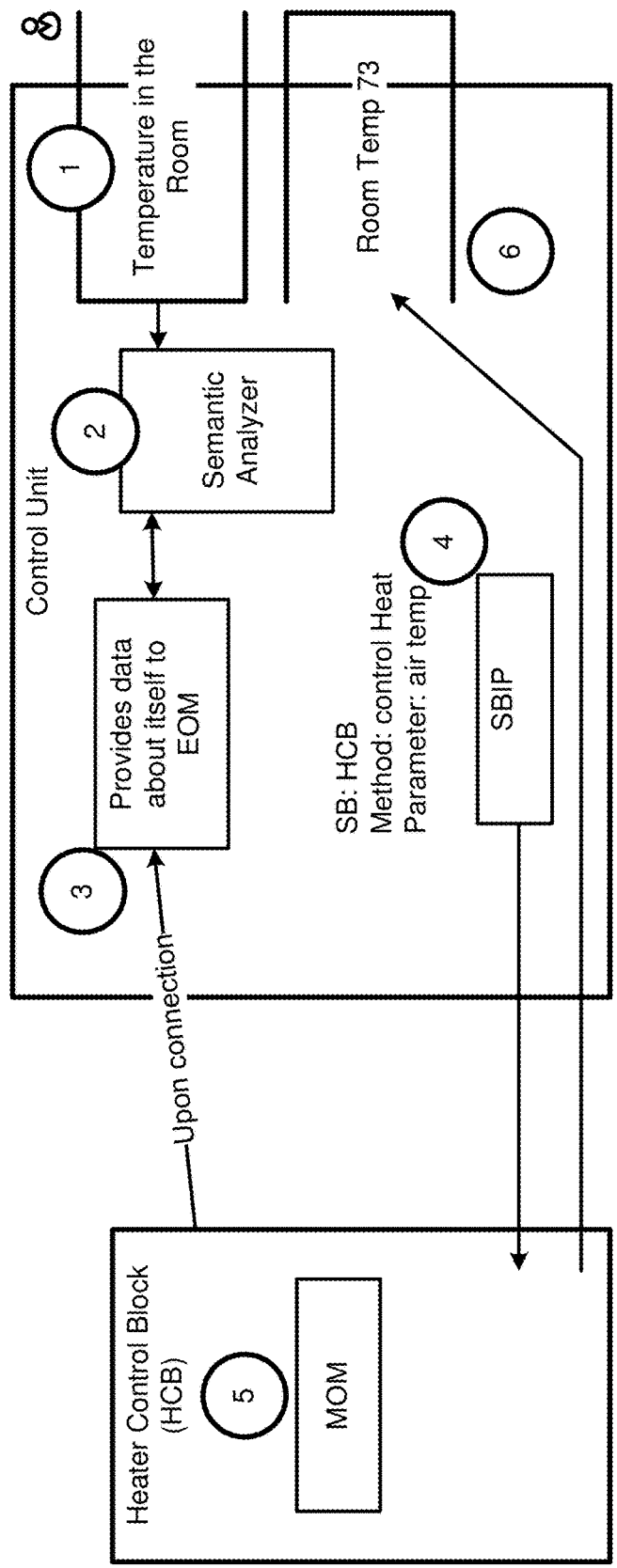
FIG. 14 illustrates an exemplary implementation of an SB infrastructure in a smarthouse.
Figure 15:
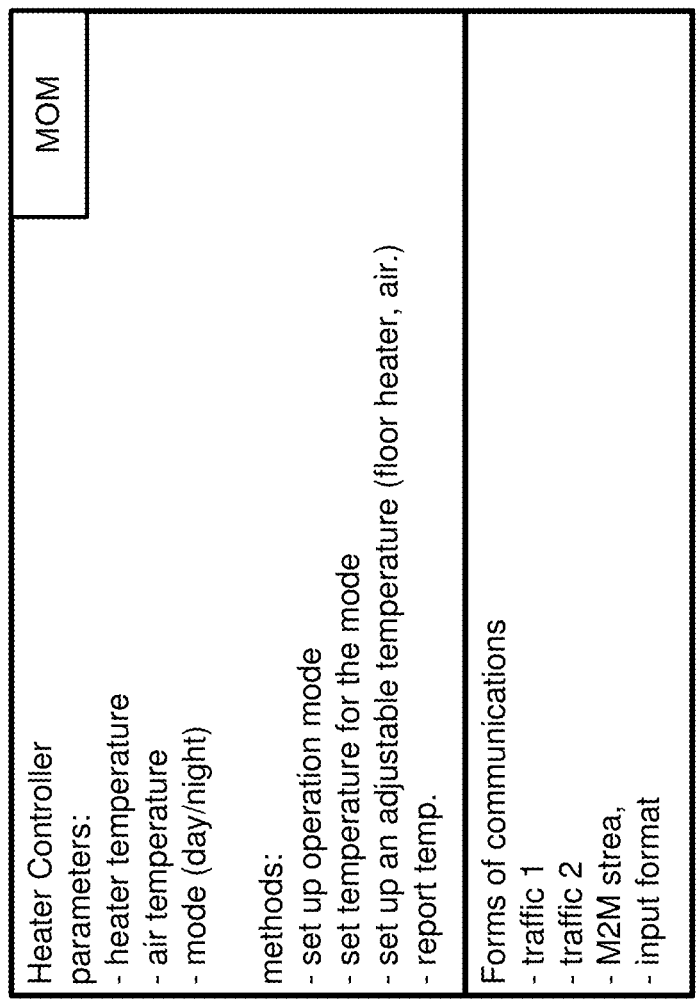
FIG. 15 illustrates an exemplary MOM used for heater control.

FIG. 14 illustrates an exemplary implementation of an SB infrastructure in a smarthouse. The SB is used here for control of a temperature in heater control block. A user inputs a request for a temperature in the room into SB control unit in step 1. The user request is processed through a semantic analyzer in step 2. The semantic analyzer dissects the user request into semantic units and finds corresponding data in the EOM in step 3. Then, the SBIP is formed in step 4. A response to the user (providing a room temperature of 73 degrees) is generated and sent in step 6. Addition of new SBs is implemented by connection and passing of MOM to the EOM in step 5. An exemplary MOM used for heater control is illustrated in FIG. 15. The MOM includes heater controller parameters, methods and forms of communications.

Figure 16:
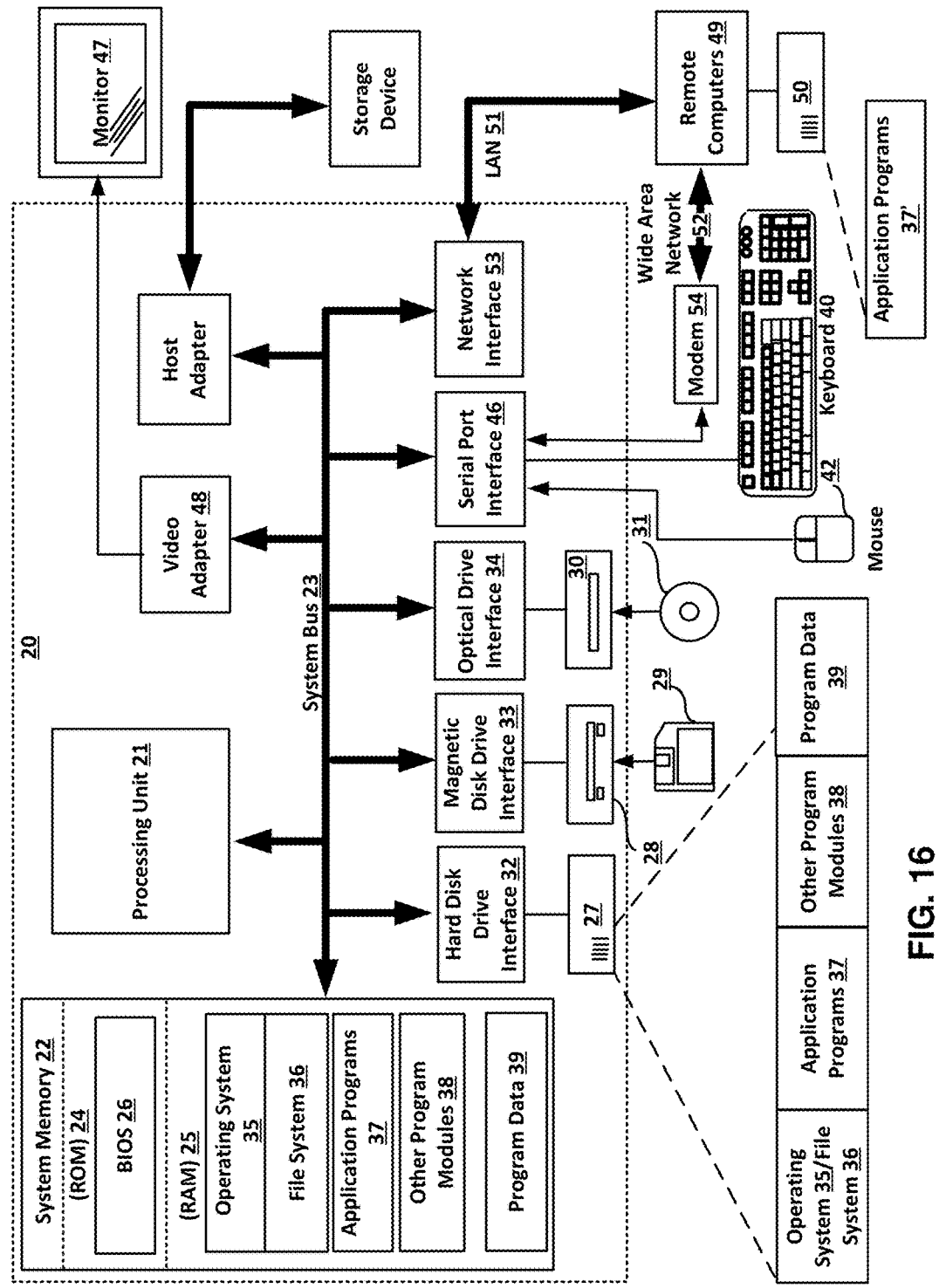
FIG. 16 illustrates a computer system or a host server, which can be used in the exemplary embodiment.

With reference to FIG. 16, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Figure 17:
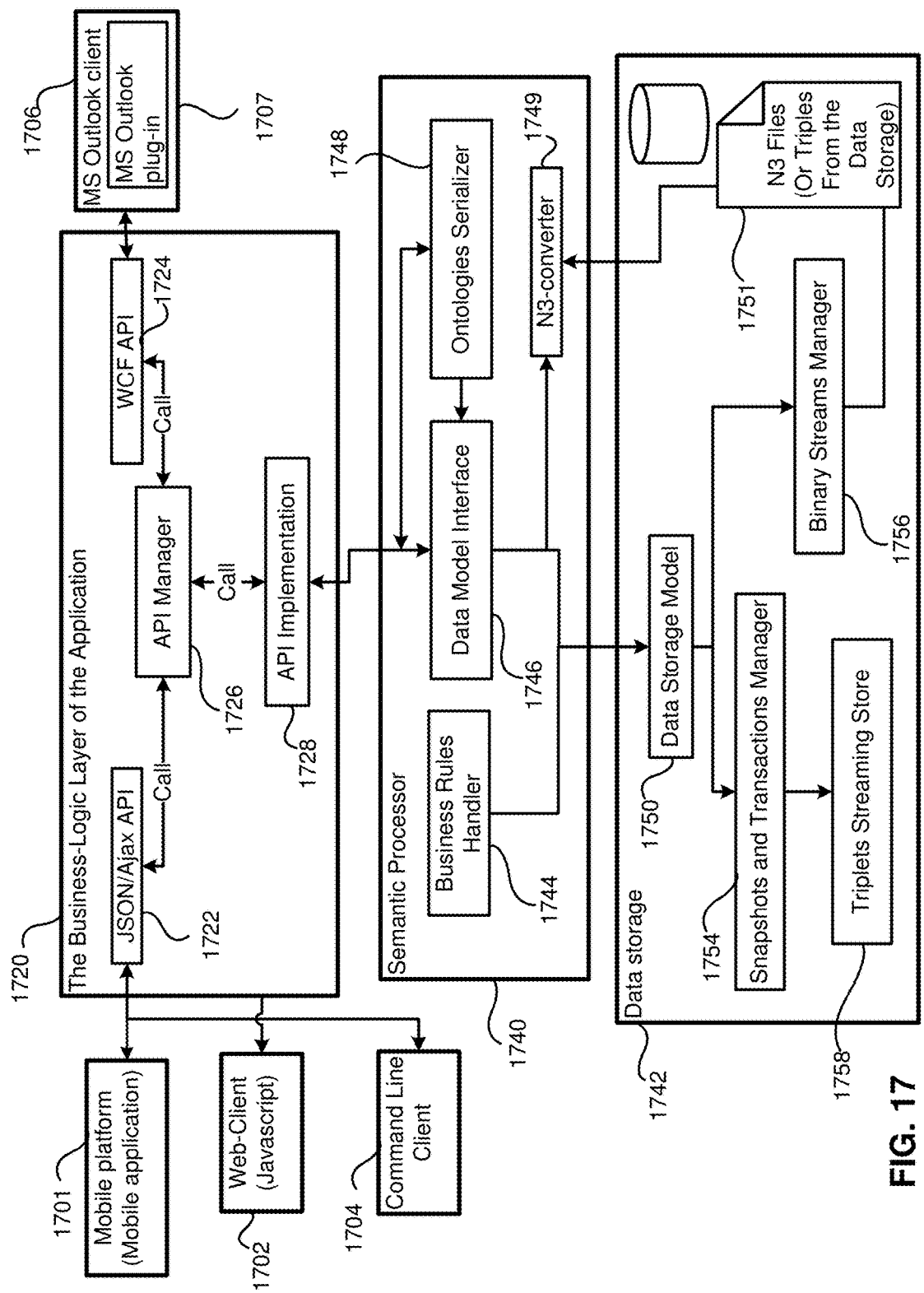
FIG. 17 illustrates the system in one embodiment of the invention.

FIG. 17 illustrates the system in one embodiment of the invention. JSON/Ajax API 1722 is a module for realization of the protocol of the API methods calls using a JSON reporting format and with a data transmission over the HTTP using Ajax requests. WCF API 1724 is a module that implements the protocol of the API methods call using the XML/SOAP representation format and a data transmission over HTTP.

The API manager module 1726:
searches for the required API method,
implements the arguments' serialization to the data structures used in the business logic ontologies,
implements API method calls,
de-serializes the results returned by the method.

API manager module 1726 uses N3-files 1730 (which contains triples in the N3 format) for searching the method implementation 1728, wherein "api:Method" ontology (for example) lists all methods, arguments types and return values. Implementation of the method is a program code. For example, it can save the data to a database, or it can close or open the task and other operations.

For example, a "CreateTask" API method is used for the task creation. The method accepts tasks data as an argument and returns the identifier for the created task. The JSON-handler gets the method name and arguments (a task data) in the JSON-format when the method is invoked via JSON-protocol. Then, arguments are converted to an internal representation of data in the memory and transmitted to the API manager. The API manager (which has a list of methods) can find the required "CreateTask" method by name. Then, the API manager validates arguments (the number and type of) and implements a method "CreateTask." After the task was created by the "CreateTask" method, the API manager transfers back the result to the JSON-handler. The JSON-handler converts the result to the JSON format and sends it back to the client (for example, to the MS Outlook client or to a mobile device application).

API Manager loads the API specification and extension modules from the Database during the application start (MS Outlook plug-in 1707). This specification can be requested by the Outlook plug-in 1707 of MS Outlook client 1706 or through a special Ajax-request or as a scheme in the WSDL-format with using a SOAP-protocol.

A Web Client 1702 (for example, based on JavaScript, or on HTML5) or the Command Line Client 1704 can be used instead of MS Outlook. Console client is the client application, which can call API methods using command line. Also, a mobile application on a mobile device 1702 can be used.

JavaScript client is a client application, which is executed in the user web-browser and which can call API methods using JavaScript language.

Outlook Add-in (Outlook client) is the client application, which is executed in the MS-Outlook application which can call API methods with using WCF-protocol.

The Web Services Description Language (WSDL) is an XML-based interface description language that is used for describing the functionality offered by a web service. A WSDL description of a web service (also referred to as a WSDL file) provides a machine-readable description of how the service can be called, what parameters it expects, and what data structures it returns. Thus, it serves a purpose that corresponds roughly to that of a method signature in a programming language.

Next, the client applications (1702, 1704, 1706) can make calls using Ajax-query reporting format JSON, or SOAP protocol.

The main stages of processing the request are:

1. Incoming request is processed by the HTTP-server (or by the External server or MS Exchange Server). JSON serialization or SOAP converting to internal formal occurs.

2. API manager 1726 receives the input data and validates the input arguments to match the method description.

3. API Manager 1726 loads and prepares required data model and creates the snapshot of the model for isolation from the other requests and operations. The write transaction is opened if the operation changes the model data.

4. Call the programming code (or rules with ontologies and Comindware® language) which executes the method.

5. The transaction is closed if the operation is a modifying operation, and checks for changes to security, the conflict detection, the update transaction history are performed.

6. The result is serialized in the format required by a customer and given to HTTP-response.

The business logic of the application 1720 implements an object layer over the facts storage. Access to data is provided through the client API, which contains methods for objects reading/writing (e.g., object templates, business rules, etc.) Calls of the API methods by clients are implemented through the sessions that are created after the client authorization. This layer contains a number of ontologies, such as, for example, "the template of the user object" or "business-rule." Ontologies are used in API for data serialization and validation.

The data storage 1742 provides a physical storage for the model data on the hard disk drive. The data is sent to the data storage 1742 and back out in the form of the facts (triples). A fact is a triple, which is stored in the model. Also, the fact can be obtained by applying the rules or requests. A data storage consists of:

triples streaming store 1758 allows to record and query triples of special file format. Streaming store triples supports multiple types of queries on various components;

The transaction and snapshots manager 1754 allows to create:

a. transactions. Transactions are the objects with the interface for atomic modification of the storage triples. Model changing is possible only within the framework of such a transaction while guaranteeing atomicity modification store triples (commit all changes made within a transaction, or none of them);

b. snapshots. Snapshots are objects with an interface for consistent read from the triple storage. It is guaranteed that none of the transactions (which were committed during the existence of the snapshot) affect its contents.

Triplets stored in the repository are simple, small objects (numbers, strings, names). The binary stream manager 1756 is used to save large values (files, data streams) onto the storage. The stream is stored in a separate file, and a link to the stream is stored to this file;

The data storage model 1750 represents a set of interfaces for managing data storage 1751. Such interfaces can include transactions, snapshots, the interface for requesting the facts (triples) from the snapshot and interface for writing the facts to the transaction.

The semantic processor 1740 contains a description of interfaces, such as name, facts (triples) and model rule.

The N3-converter 1749 allows for generation of a data model based on the content of N3-file 1730. (Note that the triples can be stored in a database in any format discussed above). A connection to the data store is another method of forming a pattern. Furthermore, the combined models can be formed, so multiple models are combined into one. Requests for such models lead to a request to the facts of each connected model. Record data while still working with only to one of the models.

A business rules handler 1744 is an optional add-on over the data model. After handler 1744 is connected with the model, it allows for computing derivatives based on existing facts and rules there.

The Data Model Interface 1746 is a set of interfaces for requesting facts from the model, for writing to the model, transactions and model snapshots creating. The Ontologies Serializer 1748 creates the queries to retrieve objects from the entire model based on the ontologies (description of the structure of objects stored in the model).

Transactions and queries are isolated using transactions. After a transaction is opened for write or read, the transaction is completely isolated from other transactions. Any changes in the data model made by other transactions are not reflected. Conflicts detection and resolution of conflicts are performed when closing the transaction, which was opened for writing. The so-called model optimistic concurrency is used. Detection of conflict occurs at the level of individual semantic facts. A conflict occurs when the fact has been modified by two transactions since the snapshot model was created and until the closing of the transaction. An exception will be generated during the conflict determination. In this case, the user can try updating the saved changes and try again to commit changes.

Optimistic concurrency control (OCC) is a concurrency control method for relational database management systems that assumes that multiple transactions can be completed without affecting each other and that therefore, transactions can proceed without locking the data resources that they affect. Before committing, each transaction verifies that no other transaction has modified its data. If the check reveals conflicting modifications, the committing transaction rolls back.

OCC is generally used in environments with a low data contention. When conflicts are rare, transactions can be completed without the expense of managing locks and without having transactions wait for other transactions' locks to clear, leading to higher throughput than other concurrency control methods. However, if conflicts happen often, the cost of repeatedly restarting transactions hurts performance significantly and other concurrency control methods have better performance under these conditions.

More specifically, OCC transactions involve these phases:

Begin: Record a timestamp marking the transaction's beginning.

Modify: Read database values, and tentatively write changes.

Validate: Check whether other transactions have modified data that this transaction has used (read or written). This includes transactions that had been completed after this transaction's start time, and optionally, transactions that are still active at validation time.

Commit/Rollback: If there is no conflict, make all changes take effect. If there is a conflict, resolve it, typically by aborting the transaction, although other resolution schemes are possible. Care must be taken to avoid a TOCT-TOU (Time-Of-Check-To-Time-Of-Use) bug, particularly if this phase and the previous one are not performed as a single atomic operation (see also discussion of the conflict resolving mechanisms between transactions, i.e., transactions not affecting each other, discussed above.)

The system described above can be used to implement the following exemplary algorithm for a method for running an enterprise Information System (IS) based on a Smart-Bricks (SB) architecture:

running an Enterprise Ontological Model (EOM) on a Control Unit;

configuring a Source component configured to store data, to receive and to output (i) the data, (ii) a data stream and (iii) an event stream, wherein the Source component comprising an input module, a semantic detection module, and a template generation module;

connecting a Transformer component to the Control Unit, wherein the Transformer component includes an SB search engine, an Smart-Bricks Instant Performance (SBIP) assembler, and an SBIP performer;

connecting an Accomplisher component to the Control Unit, wherein the Accomplisher component includes an SBIP data receiver, a user data synthesizer, and a result visualizer for rendering a result to a user;

The algorithm further includes:

using the Source component to receive a request from the user at the input interface of the input module, and/or data related to the request from an external source;

using the semantic detection module to identify a semantics of the request data, parse the user request-related data into semantic units, identify entities related request meanings, and find corresponding data units in the EOM on the Control Unit;

using the SB search engine to find, in the EOM, SBs related to a particular micro ontological model (MOM);

using the SBIP assembler to generate an SB Instant Performance (SBIP) out of SBs found in the EOM according to the particular generated MOM;

producing a response to the user request using the SBIP performer;

receiving and correcting the response using the Accomplisher component's SBIP data receiver, and creating human-readable data from a machine-readable data format, and rendering the human-readable data for the user.

Also, the system and method described herein can be implemented as:

a Control Unit configured to run an Enterprise Ontological Model (EOM);

a Source component comprising an input module, semantic detection module, templates generation module, and configured to store data, to receive-output a data, a data stream and an event stream, and having an interface for receiving user requests and an interface for outputting a result of processing of the request to the Transformer component; a Source component is connected to the Control Unit;

a Transformer component comprising a SB search engine, a SBIP assembler, and a SBIP performer, and having an interface for receiving result of processing from Source component, and an interface for outputting a result of its own processing to the Accomplisher component; a Transformer component is connected to the Control Unit;

an Accomplisher component comprising a SBIP data receiver, user data synthesizer, and a result presenter/visualizer for rendering a result to the user, and having an interface for receiving result of processing from Transformer component, and an interface for outputting a result of its own processing to the user; an Accomplisher component is connected to the Control Unit, wherein:

(a) the Source component receives the user request at the input interface of the input module, and/or data related to the request from external systems/devises;

(b) the input module sends user request-related data to the semantic detection module of the Source component;

(c) the semantic detection module starts and identifies the semantics of the request data, dissects the user request-related data into semantic units, highlights the appropriate entities related request meanings, finds corresponding data units in the EOM on the Control Unit and compares these meanings with the semantic units available in the current EOM; the result of the comparison switches the system either to the Operating mode or to the Development mode;

(d) if it is determined that the request refers to the Operation mode (i.e., the current version of the EOM has all the necessary elements to execute the request, the semantic detection module finds corresponding SBs in EOM, and sends this fact to the template generation module, described below in the position f);

(e) if it is determined that the request refers to the Development mode (i.e., the current version of the EOM does not have all the necessary elements to execute a request), the procedure described in the position n) is implemented;

(f) the templates generation module generates a template for SB assembling which is at least one micro-ontological model (MOM) based on the data units found in EOM at the previous step;

(g) thus the Source component finishes the process and sends the result of processing (i.e. MOM and data related to the request) through the output interface to the Transformer component;

(h) the Transformer component starts, its SB search engine tries to find in the EOM some existed SBs related to the particular MOM generated;

(i) the SBIP assembler generates an SB instant performance (SBIP) out of SBs found in the EOM according to the particular MOM generated;

(j) the SB Performer executes the SBIP to produce a result representing a response to the user request;

(k) thus the Transformer component finishes the process and sends the result of processing (i.e. the response to the user request in machine-readable data format) through the output interface to the Accomplisher component;

(l) the Accomplisher component starts, its SBIP data receiver receives and corrects the response, a User data synthesizer creates human-readable (user-friendly) data from machine-readable data format, and (m) the Result presenter visualizes it for rendering to the user; thus the Accomplisher component finishes the whole process of SBIS in the Operating mode;

(n) in case of Development mode is needed for SBIS's adaptability to changing external conditions (i.e. appropriate SBs does not exists in the current EOM, see position e) above), the Development mode has to be launched to provide the adaptation, which is produced by changes in the Control Unit, by creating a new version of the EOM;

(o) the process of creation of the new version of the EOM is activated by the Source component's semantic detection module command at the step e);

(p) this process creates the new SB in the EOM, and accordingly, the hew version of EOM appeared; and then this process identifies correct meaning of a new SB in a dialogue with a user. It is possible to clarify the request, if there are several information objects, in which the title contains an appropriate meaningful term.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. An enterprise Information System (IS) based on a Smart-Bricks (SB) infrastructure, the system comprising:
   a processor and a memory coupled to the processor and containing computer code for implementing a control unit configured to run an Enterprise Ontological Model (EOM) and having an input interface for receiving user requests and an output interface for outputting a result of processing of a request to the user,
   wherein the EOM represents a hierarchical ontological description of an enterprise, its business processes and its business objects and is comprised of a plurality of micro-ontological models (MOMs);
   a plurality of SBs, each SB including 1) a data component, 2) executable code, 3) an interface component to interface to users or to other SBs, 4) a micro-ontological model (MOM) that defines a relationship of the particular SB within a hierarchy of the EOM, wherein the executable code implements functionality of the SB based on the data component and the MOM,
   wherein at least some of the SBs are assembled into Smart Brick Instant Performances (SBIPs) in response to the user requests;
   the data component connected to the control unit and configured to store data and to output a data stream and an event stream;
   the executable code comprising a semantic analyzer, an SB assembler and an SB service engine;
   the interface component comprising a semantic synthesizer and a visualizer for rendering a result to the user, wherein:
   the control unit receives the user request at the input interface and queries data related to the request from the data component;
   the semantic analyzer parses user request-related data into semantic data units and finds corresponding semantic data units in the EOM on the control unit;
   based on the found semantic data units, the EOM identifies the SBs whose MOMs correspond to the found semantic data units and the business objects corresponding to the semantic data units;
   the SB assembler generates an SB instant performance (SBIP) process based on the MOMs in the identified SBs;
   the SB service engine executes the SBIP to produce a result representing a response to the user request;
   the semantic synthesizer corrects the response and visualizes it for rendering to the user; and
   the control unit renders the response to the user through the output interface.

2. The system of claim 1, wherein the SBIP is assembled as a plurality of instantaneous info-conglomerates for performing the user request.

3. The system of claim 1, wherein the EOM comprises all possible concepts describing a subject area of the enterprise.

4. The system of claim 1, wherein the data component includes the business objects.

5. The system of claim 1, wherein the control unit of the EOM generates a plurality of new MOMs based on the user request.

6. The system of claim 1, further comprising a plurality of macro-level components each comprising their own control units, data components, executable code and interface components.

7. The system of claim 1, wherein the EOM uses the SBs and the SBIP for generation of the results of the user request.

8. The system of claim 1, wherein an input interface of the data component comprises a speech input interface or a machine input interface.

9. The system of claim 1, wherein the MOM comprises any of:
   concepts;
   parameters;
   business objects; and
   methods.

10. A method for processing a user request based on a Smart-Brick (SB) architecture, the method comprising:
    receiving a user request at an input interface;
    querying data related to the request from a source component;
    parsing user request-related data into semantic data units by a semantic analyzer;
    finding corresponding semantic data units in an Enterprise Ontological Model (EOM),
    wherein the EOM represents a hierarchical ontological description of an enterprise, its business processes and its business objects and is comprised of a plurality of micro-ontological models (MOMs),
    wherein the architecture includes a plurality of SBs, each SB including 1) a data component, 2) executable code, 3) an interface component to interface to users or to other SBs, 4) a micro-ontological model (MOM) that defines a relationship of the particular SB within a hierarchy of the EOM, wherein the executable code implements functionality of the SB based on the data component and the MOM,
    wherein at least some of the SBs are assembled into Smart Brick Instant Performances (SBIPs) in response to the user requests;
    identifying, based on the found semantic data units, the SBs whose MOMs correspond to the found semantic data units and the business objects corresponding to the found semantic data units;
    assembling an SB instant performance (SBIP) out of SBs and based on the MOMs in the identified SBs;
    executing the SBIP to produce a response to the user request by a combination of an SB search engine, an SBIP assembler, and a SBIP performer;
    correcting the response by a semantic synthesizer; and
    visualizing the response for rendering to the user,
    wherein an SB search engine, SBIP assembler, and the SBs and the SB and SBIP for generation of the result, and an SBIP data receiver receives and corrects the response, and a user data synthesizer creates human-readable data from a machine-readable data format.

11. An enterprise Information System (IS) based on a Smart-Bricks (SB) architecture, the system comprising:
    a processor and a memory coupled to the processor and containing computer code for implementing a Control Unit configured to run an Enterprise Ontological Model (EOM),
    wherein the EOM represents a hierarchical ontological description of an enterprise, its business processes and its business objects and is comprised of a plurality of micro-ontological models (MOMs);

a Source component comprising an input module, a semantic detection module, and a template generation module, the Source component configured to store data, to receive and to output (i) the data, (ii) a data stream and (iii) an event stream;

a Transformer component connected to the Control Unit, and comprising executable code for an SB search engine, an Smart-Bricks Instant Performance (SBIP) assembler, and an SBIP performer, wherein the Transformer component implements functionality of an SB based on the Source component and a MOM of the SB;

an Accomplisher component connected to the Control Unit, and comprising an SBIP data receiver, a user data synthesizer, and a result visualizer for rendering a result to a user;

wherein:

a) the Source component receives a request from the user at an input interface of the input module, and/or data related to the request from an external source;

b) the semantic detection module starts and identifies a semantics of the request data, parses user request-related data into semantic data units, identifies entities related request meanings, and finds corresponding semantic data units in the EOM on the Control Unit;

c) the SB search engine finds, in the EOM, based on the found semantic data units, the SBs whose MOMs correspond to the found semantic data units and the business objects corresponding to the semantic data units;

d) the SBIP assembler generates an SB Instant Performance (SBIP) out of SBs found in the EOM according to a particular generated MOM and in response to the request;

e) the SBIP Performer executes the SBIP to produce a response to the request;

f) the Accomplisher component's SBIP data receiver receives and corrects the response, and a User data synthesizer creates human-readable data from a machine-readable data format, and g) the result visualizer presents human-readable data to the user.

12. The system of claim 11, wherein the Source component further includes an interface for receiving the requests and an interface for outputting the response to the Transformer component.

13. The system of claim 12, wherein the template generation module generates a template for SB assembling and wherein the template includes at least one micro-ontological model (MOM) based on the semantic data units found in the EOM.

14. The system of claim 11, wherein the input module sends user request-related data to the semantic detection module.

15. The system of claim 11, wherein the semantic detection module compares the found semantic data units with semantic data units available in the EOM, and based on the comparison, switches the system either to an Operating mode or to a Development mode.

16. The system of claim 15, wherein when a required SB does not exist in the EOM, the Development mode is launched to provide an adaptation by creating a new version of the EOM.

17. The system of claim 16, wherein the creation of the new version of the EOM is activated by a command of the semantic detection module and a new SB is created in the EOM, and then the system identifies a correct meaning of a new SB in a dialogue with a user.

18. A method for implementing an enterprise Information System (IS) using a Smart-Bricks (SB) architecture, the method comprising:

running an Enterprise Ontological Model (EOM) on a Control Unit, wherein the EOM represents a hierarchical ontological description of an enterprise, its business processes and its business objects and is comprised of a plurality of micro-ontological models (MOMs);

configuring a Source component configured to store data, to receive and to output (i) the data, (ii) a data stream and (iii) an event stream, wherein the Source component includes an input module, a semantic detection module, and a template generation module;

connecting a Transformer component to the Control Unit, wherein the Transformer component includes an SB search engine, an Smart-Bricks Instant Performance (SBIP) assembler, and an SBIP performer, wherein the Transformer component implements functionality of an SB based on the Source component and a MOM of the SB;

connecting an Accomplisher component to the Control Unit, wherein the Accomplisher component includes an SBIP data receiver, a user data synthesizer, and a result visualizer for rendering a result to a user;

and further comprising:

a) using the Source component to receive a request from the user at an input interface of the input module, and/or data related to the request from an external source;

b) using the semantic detection module to identify a semantics of the request data, parse the user request-related data into semantic units, identify entities related request meanings, and find corresponding data units in the EOM on the Control Unit;

c) using the SB search engine to find, in the EOM, based on the found semantic data units, the SBs whose MOMs correspond to the found semantic data units and the business objects corresponding to the semantic data units;

d) using the SBIP assembler to generate an SB Instant Performance (SBIP) out of SBs found in the EOM according to the particular generated MOM;

e) producing a response to the user request using the SBIP performer;

f) receiving and correcting the response using the Accomplisher component's SBIP data receiver, and creating human-readable data from a machine-readable data format, and g) rendering the human-readable data for the user.

* * * * *